United States Patent [19]
Honda et al.

[11] Patent Number: 5,748,444
[45] Date of Patent: May 5, 1998

[54] PORTABLE ELECTRONIC APPARATUS HAVING FRAME WITH COOLING AIR FLOWING PASSAGE

[75] Inventors: Masami Honda; Kazuya Shibasaki, both of Tokyo, Japan

[73] Assignee: Kabushiki Kaisha Toshiba, Kawasaki, Japan

[21] Appl. No.: 616,075

[22] Filed: Mar. 14, 1996

[30] Foreign Application Priority Data

Mar. 24, 1995 [JP] Japan .................... 7-066185

[51] Int. Cl.⁶ ................................................. H05K 7/20
[52] U.S. Cl. ............................................ 361/687; 361/697
[58] Field of Search ................ 364/708.1; 165/80.3, 165/121–126; 454/184; 312/208.1, 208.4, 223.2; 361/680, 681, 687, 690, 692, 703, 694–697, 704, 705, 717–720

[56] References Cited

U.S. PATENT DOCUMENTS

| | | |
|---|---|---|
| 4,781,422 | 11/1988 | Kimble . |
| 4,802,605 | 2/1989 | Salmon et al. . |
| 4,986,763 | 1/1991 | Boyle . |
| 5,132,875 | 7/1992 | Plesinger ............... 361/386 |
| 5,237,486 | 8/1993 | LaPointe et al. . |
| 5,251,096 | 10/1993 | Hosoi ................... 361/687 |
| 5,475,563 | 12/1995 | Donahoe ............... 361/695 |
| 5,495,389 | 2/1996 | Dewitt .................. 361/683 |
| 5,557,500 | 9/1996 | Baucom ................ 361/704 |
| 5,581,443 | 12/1996 | Nakamura ............. 361/705 |
| 5,590,024 | 12/1996 | Honda .................. 361/684 |

FOREIGN PATENT DOCUMENTS

| | | | |
|---|---|---|---|
| 3-297198A | 12/1991 | Japan | ............... 361/687 |
| 5-19896 | 1/1993 | Japan . | |

*Primary Examiner*—Gerald P. Tolin
*Attorney, Agent, or Firm*—Limbach & Limbach, LLP

[57] ABSTRACT

A portable electronic apparatus comprises a box-shaped housing. A metal-made frame is contained in the housing. The frame supports a circuit board. A circuit element, generating heat while operating, is mounted on the circuit board. A fan is contained in the housing so as to guide cooling air to the circuit element. The frame has a cooling air passage to guide cooling air thereto by the fan. The cooling air passage has a heat receiving part where heat of the circuit element is transmitted, and the heat receiving part is cooled by cooling air flowing to the cooling air passage.

19 Claims, 27 Drawing Sheets

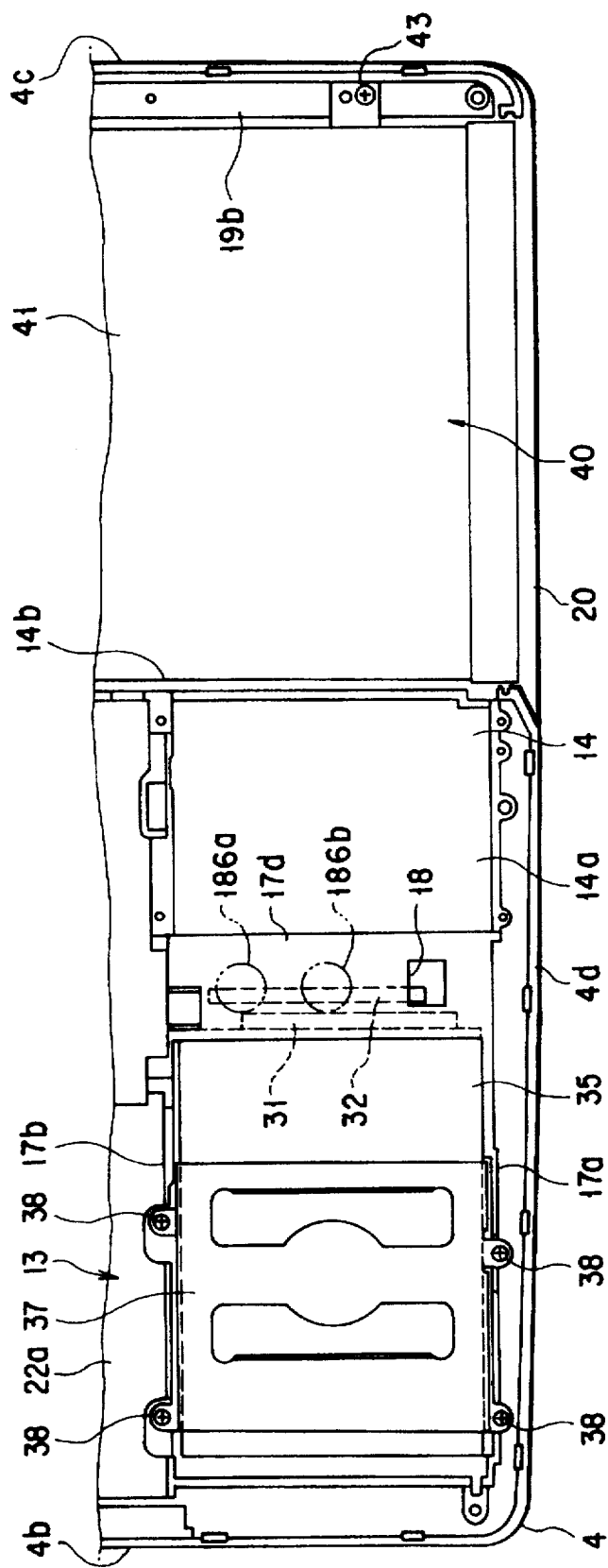
F I G. 6

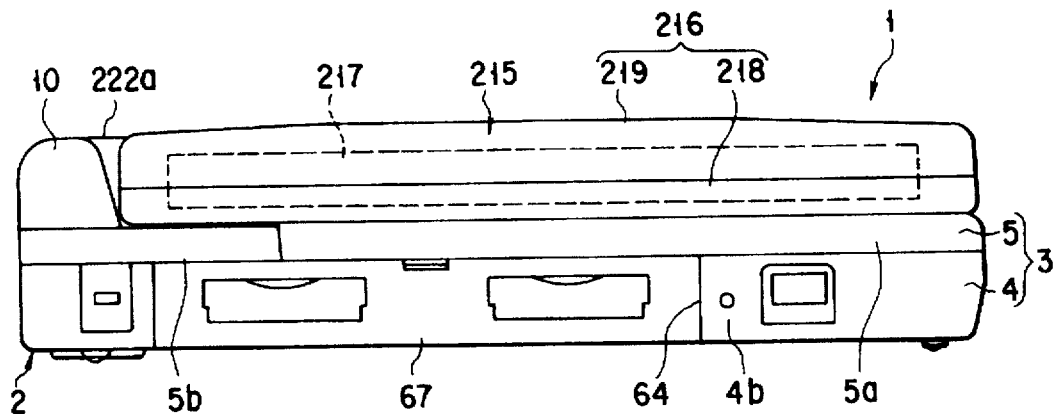
F I G. 7
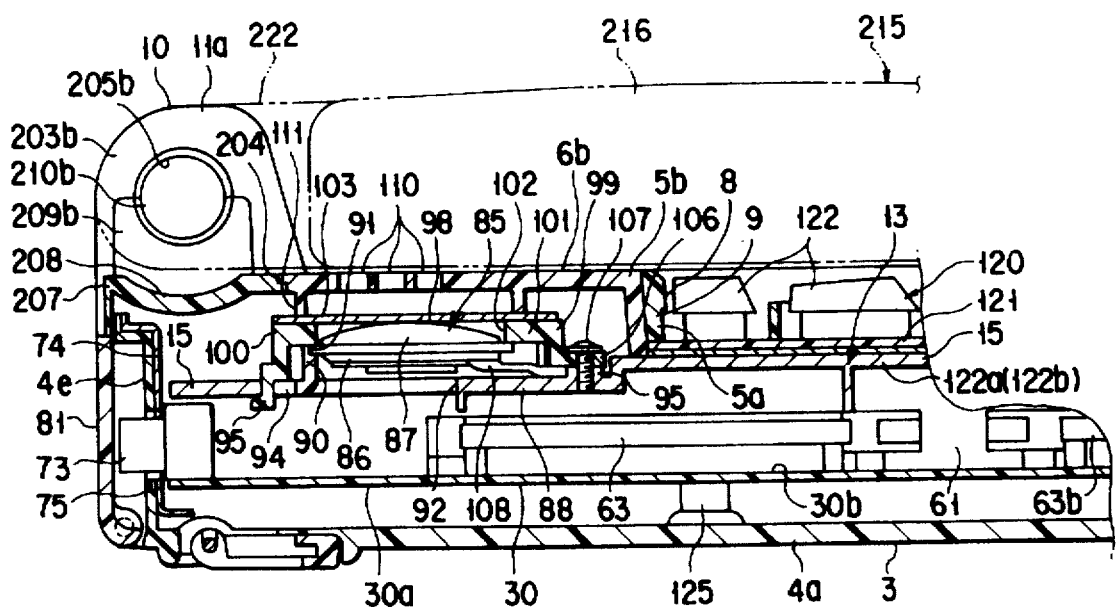
F I G. 8

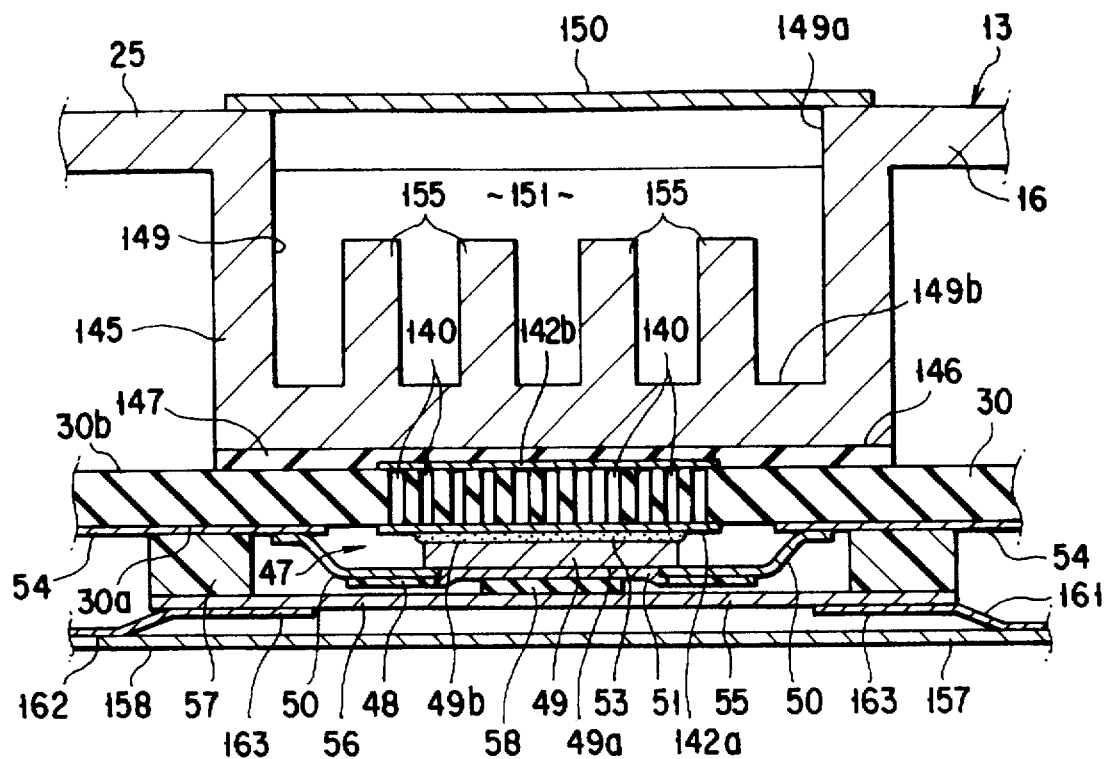
F I G. 12A
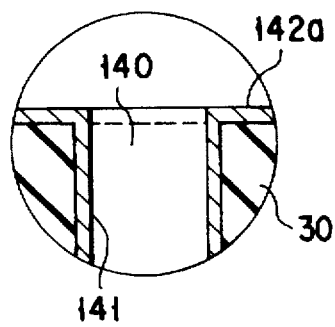
F I G. 12B

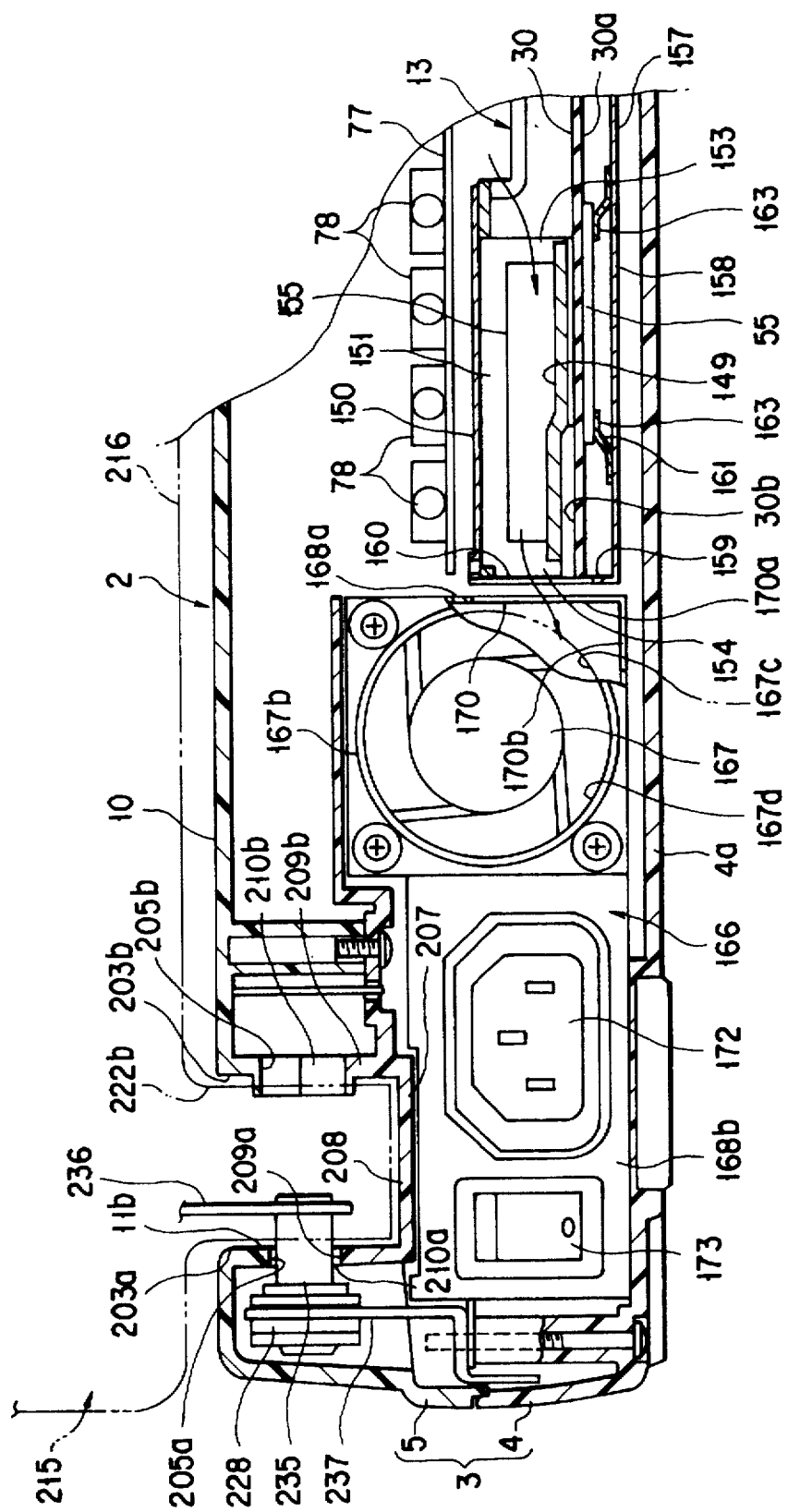
F I G. 15

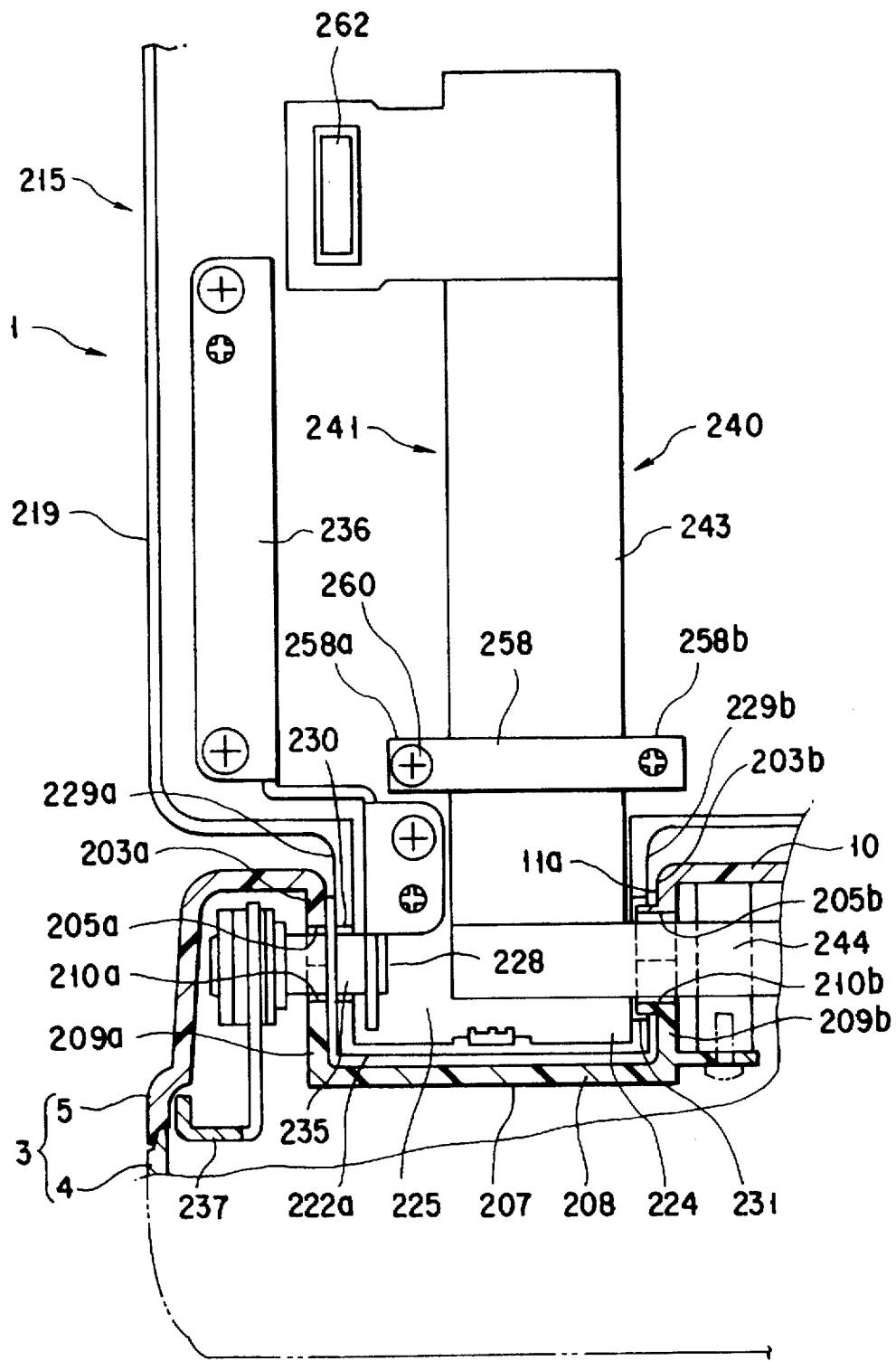
F I G. 24

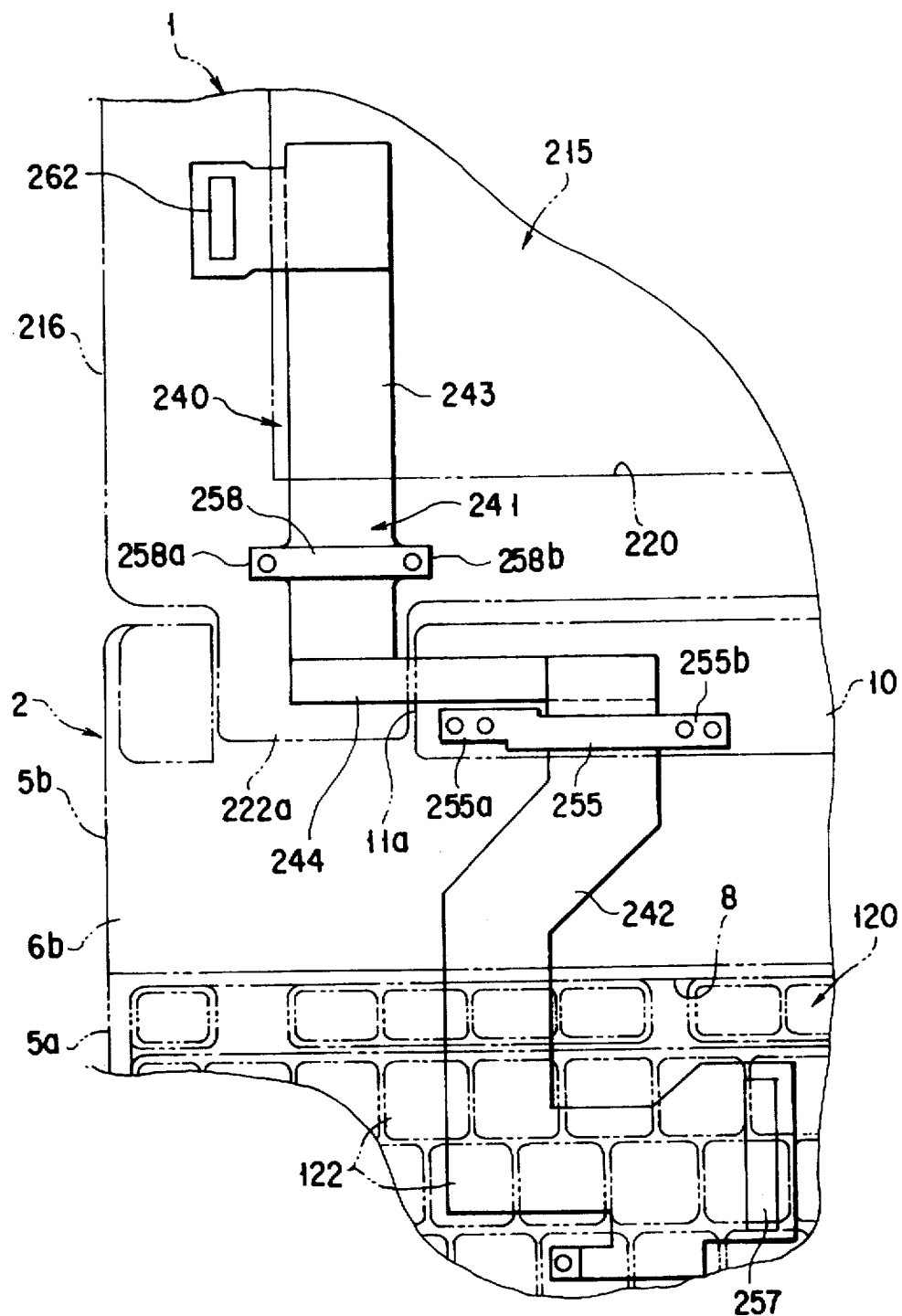
F I G. 29

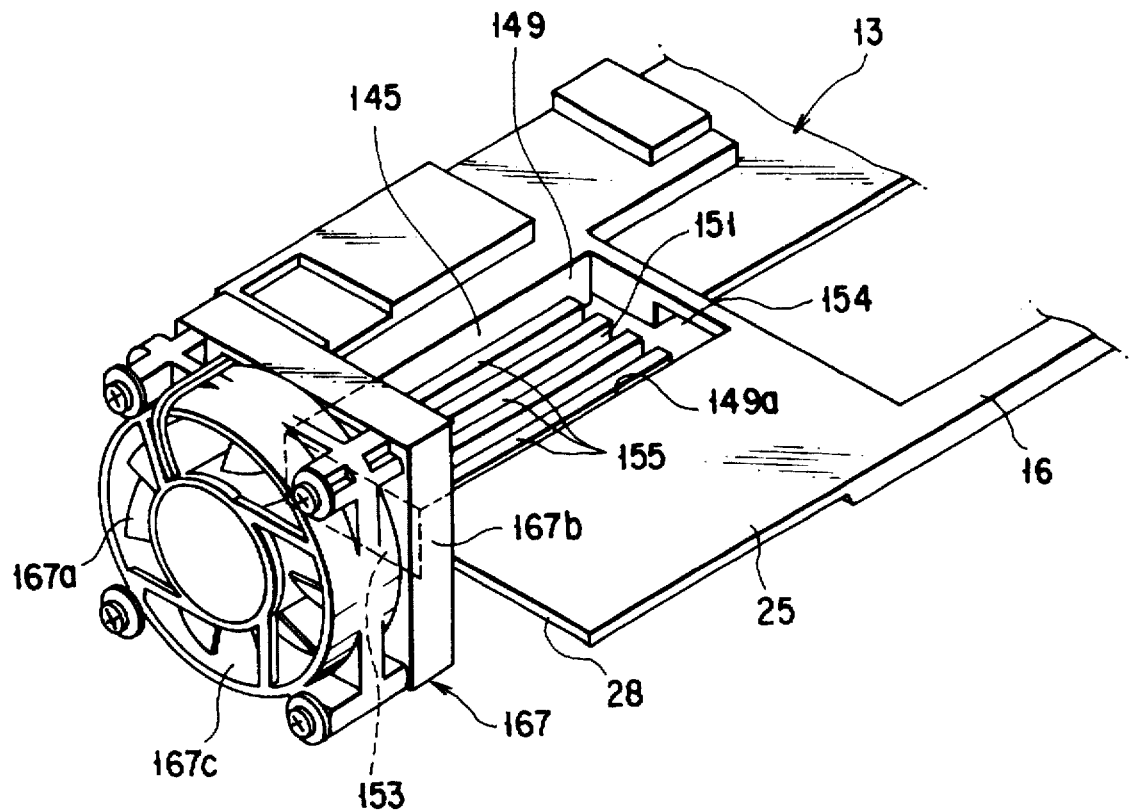
F I G. 35A
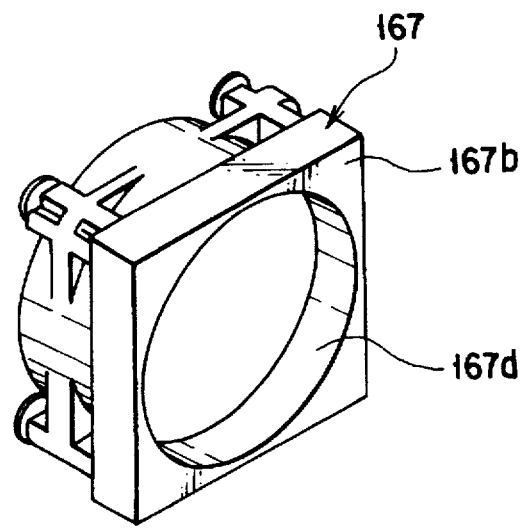
F I G. 35B

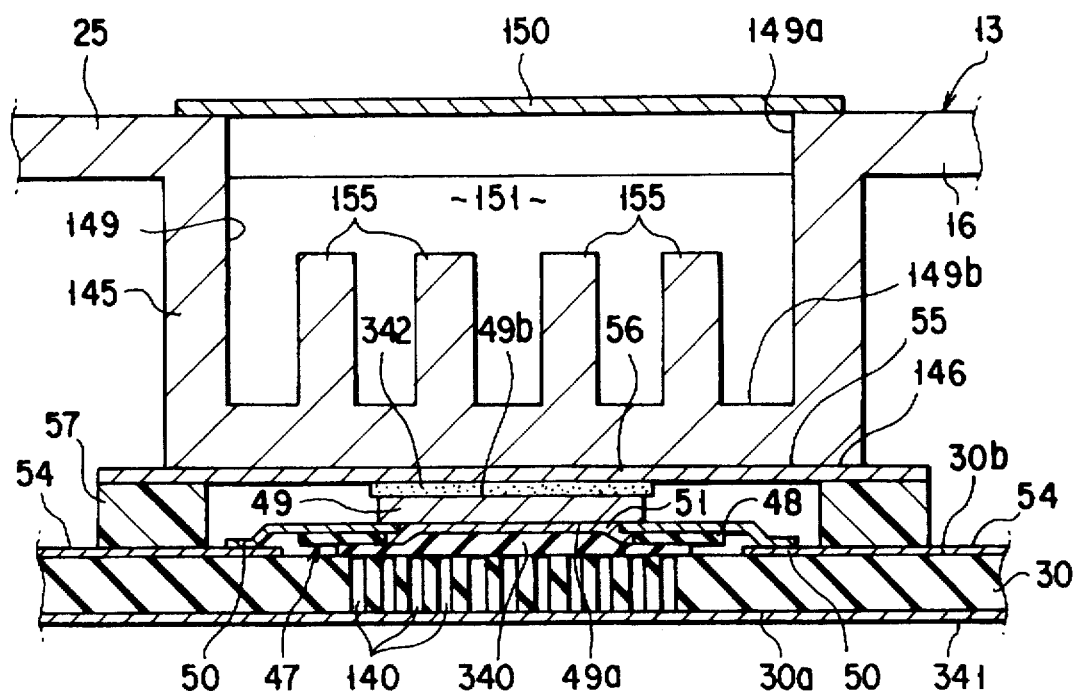
F I G. 36
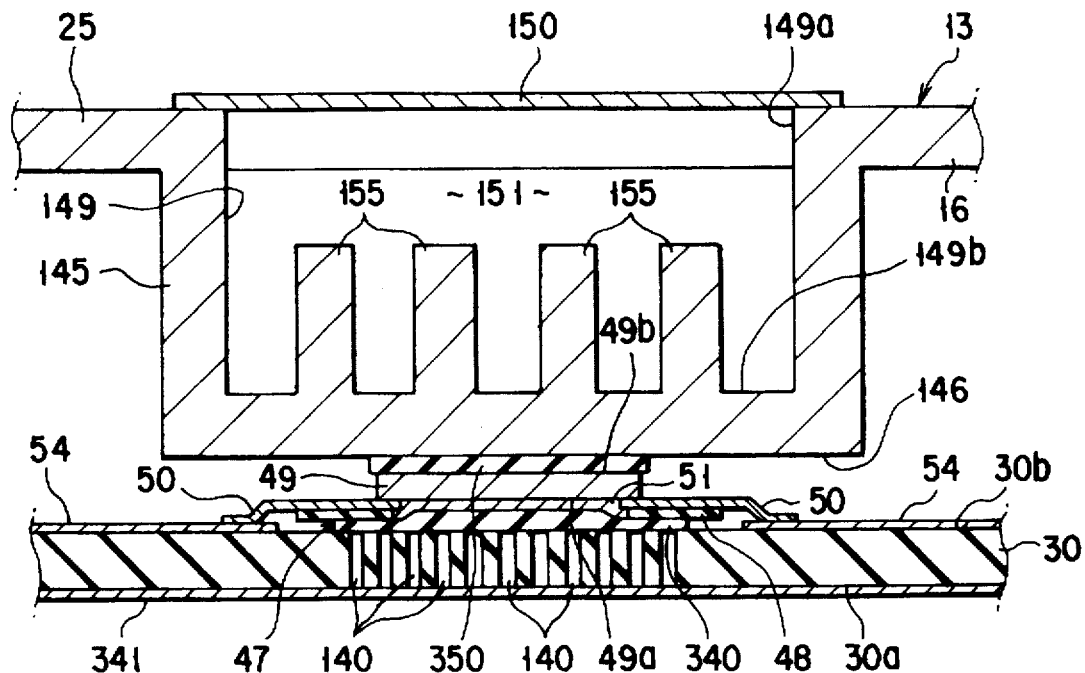
F I G. 37

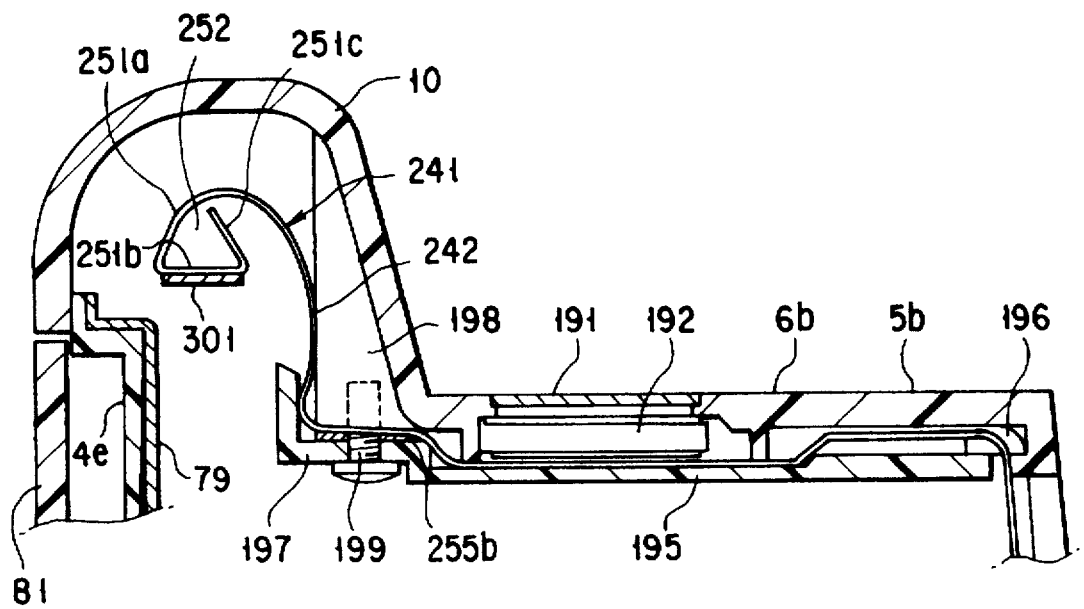
F I G. 38
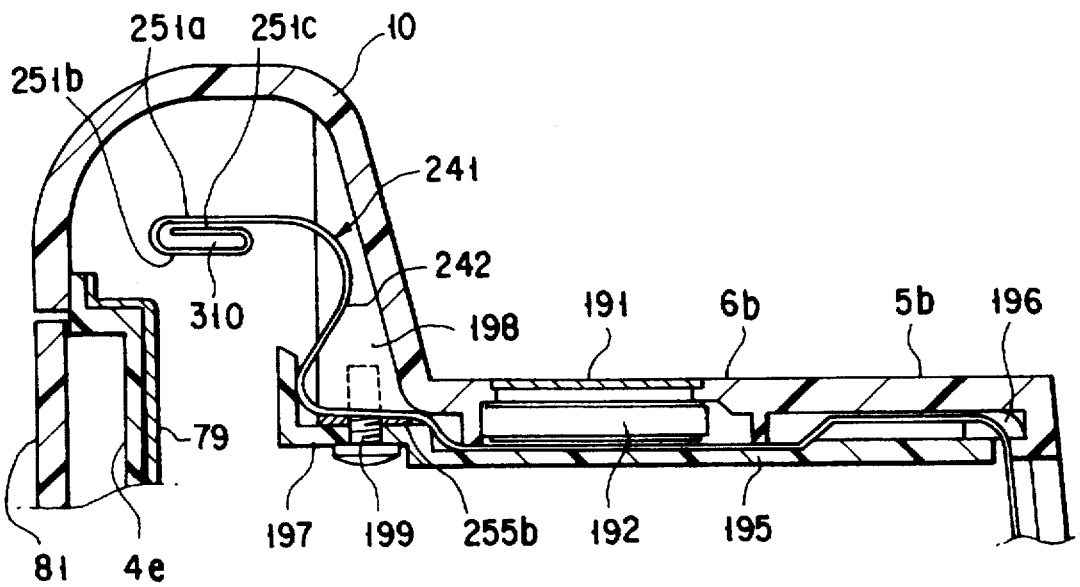
F I G. 39

PORTABLE ELECTRONIC APPARATUS HAVING FRAME WITH COOLING AIR FLOWING PASSAGE

BACKGROUND OF THE INVENTION

1. Field of the Invention

The present invention relates to a portable electronic apparatus such as a portable computer, which has a circuit board having a heating circuit element such as a TCP (tape carrier package) mounted on it, and more particularly to a structure for improving diffusion of heat from the circuit element.

2. Description of the Related Art

Book-type and notebook-type portable computers recently developed have been made increasingly compact and capable of performing more and more functions. Each portable computer comprises a circuit board and an LSI package, which is mounted on the circuit board. In the LSI package, there have been advanced the increases in data-storage capacities and the functions. By the increase in data-storage capacities and the functions, an enlargement of a chip size and the use of many pins are brought about, so that an area which the LSI package occupies on the circuit board becomes larger. In order to control the area which the LSI package occupies and deal with the use of many pins, it is required that a lead pitch of the LSI package be minimized.

As a compact package, which can be adapted to the use of many pins, attention has been recently paid to a TCP (tape carrier package). The TCP comprises a resin film, a large number of leads provided on the resin film, and an IC chip supported on the resin film. The leads have their end portions extended to an outer peripheral portion of the resin film. These end portions are soldered to a pad, which is provided on the circuit board.

In the TCP, the IC chip is not molded by resin. The IC chip is externally exposed. Due to this, mechanical strength of the TCP is weaker than that of PGA (pin grid array). Though the IC chip generates a great amount of heat while operating, it is difficult to directly attach a heatsink, which has a large number of heat radiation fins, to the IC chip. Therefore, it is important to improve the heat radiation of the TCP when the TCP is contained in a housing of the computer.

In order to improve the heat radiation of TCP, several methods have been conventionally known. There is typically a method in which an electric fan for blowing is provided in the housing of the computer to forcibly cool the TCP with cooling air sent by the electric fan. In this case where the TCP is forcibly cooled by the electric fan, it is needed that the TCP be provided on a cooling air passage of cooling air sent from the electric fan. However, in the recent portable computer, the housing has been made compact, and a large number of functional parts such as a hard disk driving device, a floppy disk driving disk, and a power unit are provided in the housing with high density. Due to this, the flow of the cooling air directing to the TCP is prevented by the above functional parts. Then, the amount of cooling air to be guided to the TCP is actually reduced. Therefore, in spite of the point that the TCP is structured to be forcibly cooled, there is a problem in that heat easily stays around the TCP and the head radiation of the TCP is not sufficiently performed.

As the other example for improving the heat radiation of the TCP, there is a method in which the IC chip is adhered to the circuit board, heat of the IC chip is transmitted to the circuit board so as to perform the heat radiation of the TCP. However, since the size of the circuit board is limited, heat of the TCP cannot be diffused over the wide range. Moreover, many circuit elements other than the TCP are mounted on the circuit board. Due to this, if the heat of the IC chip is transmitted to the circuit board, transmission of heat to the circuit elements cannot be avoided. Due to this, heat influence is extremely largely exerted on the circuit elements. Then, if the circuit elements are over-heated, three is caused a problem in that the functions of the circuits elements are lowered.

SUMMARY OF THE INVENTION

An object of the present invention is to provide a portable electronic apparatus, which can diffuse heat of a circuit element by use of a frame, and which can improve heat radiation of the circuit element as controlling heat influence exerting on the circuit board to be small.

In order to achieve the above-mentioned object, according to a first aspect of the present invention, there is provided a portable electronic apparatus comprising a box-shaped housing; a metal-made frame contained in the housing; a circuit board supported by the frame, and contained in the housing; a circuit element, mounted on the circuit board, and generating heat while operating; and a fan, contained in the housing, for guiding cooling air to the circuit element, wherein the frame has a cooling air passage where cooling air is guided by the fan, and the cooling air passage has a heat receiving part where heat of the circuit element is transmitted.

According to the above structure, when the circuit element generates heat in accordance with the operation of the apparatus, heat of the circuit element is transmitted to the heat receiving part of the frame. Since the frame having the heat receiving part is made of metal to which heat is easily transmitted, heat is diffused over a wide range of the frame without staying on the heat receiving part. Also, since cooling air is guided to the cooling air passage by the fan, the heat receiving part is forcibly cooled, so that heat radiation of the heat receiving part is improved. Due to this, heat transmitted from the circuit element can be efficiently transmitted to the outside of the frame.

Also, in order to achieve the above-mentioned object, according to a second aspect of the present invention, there is provided a portable electronic apparatus comprising a box-shaped housing; a metal-made frame contained in the housing; a circuit board supported by the frame, and contained in the housing, the circuit board having a first surface and a second surface positioned at an opposite side of the first surface; a circuit element, mounted on the first surface of the circuit board, and generating heat while operating; and a fan, contained in the housing, for guiding cooling air to the circuit element, wherein the frame has a cooling air passage where cooling air is guided by the fan, and the cooling air passage has a heat receiving part brought into contact with the second surface of the circuit board at a position corresponding to the circuit element.

According to the above structure, when the circuit element generates heat in accordance with the operation of the apparatus, heat of the circuit element is transmitted to the circuit board through the first surface. The circuit board contacts the heat receiving part at the opposite side of the circuit element. Due to this, heat of the circuit element transmitted to the circuit board is transmitted to the heat receiving part through the second surface without being widely diffused to the circuit board. Since the frame having the heat receiving part is made of metal to which heat is easily transmitted, heat is diffused over a wide range of the frame without staying on the heat receiving part. Also, since cooling air is guided to the cooling air passage by the fan, the heat receiving part is forcibly cooled, so that heat radiation of the heat receiving part is improved. Due to this, heat transmitted from the circuit element can be efficiently transmitted to the outside of the frame.

Moreover, in order to achieve the above-mentioned object, according to a third aspect of the present invention, there is provided a portable electronic apparatus comprising a box-shaped housing; a metal-made frame cast-molded, and the frame contained in the housing; a circuit board supported by the frame, and contained in the housing; a circuit element, mounted on the circuit board, and generating heat while operating; and a fan, contained in the housing, for guiding cooling air to the circuit element, wherein the frame has a concave section having an opening portion opened to an opposite side of the circuit board, and a cover plate for closing the opening portion of the concave section, and the cover plate forms a cylindrical hollow cooling air passage where cooling air is guided by the fan in cooperation with the concave section, and the cooling air passage has a heat receiving part where heat of the circuit element is transmitted.

According to the above structure, when the circuit element generates heat in accordance with the operation of the apparatus, heat of the circuit element is transmitted to the heat receiving part of the frame. Since the frame having the heat receiving part is made of metal to which heat is easily transmitted, heat is diffused over a wide range of the frame without staying on the heat receiving part. Also, since cooling air is guided to the cooling air passage by the fan, the heat receiving part is forcibly cooled. Particularly, since the cooling air passage is cylindrically hollow shaped, the cooling air guided to the cooling air passage is not leaked to the interior of the housing, and the amount of cooling air flowing to the passage is increased. Due to this, heat radiation of the heat receiving part is improved. Then, heat transmitted from the circuit element can be efficiently transmitted to the outside of the frame.

Moreover, the cooling air passage comprises the concave portion of the frame and the cover plate for closing the opening of the concave portion. Due to this, the structure of the metal mold using when the frame is case-molded can be simplified even if the cooling air passage is cylindrically hollow shaped.

Furthermore, in order to achieve the abovementioned object, according to a fourth aspect of the present invention, there is provided a portable electronic apparatus comprising a box-shaped housing having an upper surface having a keyboard attaching port; a metal-made frame contained in the housing to face to the keyboard attaching port; a keyboard, mounted on the frame, having a number of keys positioned at the keyboard attaching port; a circuit board supported by the frame, and contained in the housing; a circuit element, mounted on the circuit board, and generating heat while operating; and a fan, contained in the housing, for absorbing external air into the housing, wherein the frame comprises a cooling air passage having a cooling air inlet opened in the housing, a cooling air outlet formed to be continuous to the fan, and a heat receiving part where heat of the circuit element is transmitted, the upper surface of the housing has a wall extending downward from an opening peripheral edge portion of the keyboard attaching port to the interior of the housing, the wall has a cooling air intake port continuous to the interior of the housing, and the cooling air intake port is arranged to be adjacent to keys of the keyboard.

According to the above structure, when the circuit element generates heat in accordance with the operation of the apparatus, heat of the circuit element is transmitted to the heat receiving part of the frame. Since the frame having the heat receiving part is made of metal to which heat is easily transmitted, heat is diffused over a wide range of the frame without staying on the heat receiving part. If the fan is driven, the interior of the housing becomes negative pressure, air is absorbed from the air intake port of the housing. Air is guided to the cooling air inlet, and flows to the cooling air passage toward the cooling air outlet as cooling air. By the circulation of cooling air, the heat receiving part is forcibly cooled, so that heat radiation of the heat receiving part is improved. Due to this, heat transmitted from the circuit element can be efficiently transmitted to the outside of the frame.

Furthermore, according to the above-mentioned structure, the cooling air intake port is positioned to be overlaid on the keys of the keyboard at the inner side of the keyboard attaching port, and the cooling air intake port can be covered with these keys. Due to this, the cooling air intake port cannot be easily seen from the outside of the housing, and the appearance of the housing can be maintained well.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 34 show a portable computer of a first embodiment of the present invention;

FIG. 1 is a perspective view of the portable computer;

FIG. 2 is a perspective view of the portable computer to show a state that a front cover is detected from a lower housing and a first containing section is exposed;

FIG. 3 is a perspective view of the portable computer to show a state that the front cover and a keyboard are detached from the lower housing and the first containing section and a frame are exposed;

FIG. 4 is a perspective view of the frame;

FIG. 5 is a cross sectional view of the portable computer to show a state that a hard disk driving device and a CD-ROM driving device are contained in the housing;

FIG. 6 is a plane view of the portable computer to show a state that the hard disk driving device and the CD-ROM driving device are contained in the housing;

FIG. 7 is a left side view of the portable computer;

FIG. 8 is a cross sectional view of the portable computer to show portions where a speaker and a card containing section are attached;

FIG. 9 is a perspective view showing a state that the speaker is detached from a speaker supporting section of the frame;

FIG. 10 is a perspective view showing a state that the speaker is attached to the speaker supporting section and coated with a cover;

FIG. 11 is a perspective view of the speaker supporting section seen from a back side of the frame;

FIG. 12A is a cross sectional view showing a positional relationship between a TCP and a heat receiving part of the frame;

FIG. 12B is a cross sectional view showing an enlarged through hole portion of a circuit board;

FIG. 13 is a cross sectional view of the portable computer to show a state that the frame and the circuit board are contained in the housing;

FIG. 14 is a cross sectional view of the portable computer to show a positional relationship among the TCP, the heat receiving part of the frame, and a cooling air inlet port of the housing;

FIG. 15 is a cross sectional view of the portable computer to show a positional relationship among the TCP, the heat receiving part of the frame, and a fan unit;

FIG. 16 is a perspective view showing a state that a package cover is detached from the circuit board;

FIG. 17 is a perspective view showing the positional relationship among the circuit board, the heat receiving part of the frame, and a bracket having a spring member in an exploded manner;

FIG. 18 is a perspective view showing a positional relationship between the fan unit and the heat receiving part of the frame;

FIG. 19 is a cross sectional view of the portable computer to show a shape of an opening of the cooling air inlet port;

FIG. 20 is a perspective view of a click switch button;

FIG. 21 is a cross sectional view of the click switch button;

FIG. 22 is a perspective view of the portable computer seen from a back portion;

FIG. 23 is a perspective view of the portable computer to show a connecting portion between the housing and a display unit;

FIG. 24 is a cross sectional view of the portable computer to show the connecting portion between the housing and the display unit;

FIG. 25 is a perspective view of the cable insertion passage seen from a reverse side of a rear housing;

FIG. 26 is a perspective view showing a state that a second board section of the cable is maintained in the rear housing by a panel holder;

FIG. 27 is a perspective view of the cable electrically connecting to the circuit board and the display unit;

FIG. 28 is a plane view of the cable electrically connecting to the circuit board and the display unit in an expanded state;

FIG. 29 is a plane view of the portable computer to show the insertion passage of the cable electrically connecting to the circuit board and the display unit;

FIG. 30 is a cross sectional view of the portable computer to show the shape, which is from a third board section of the cable to a first board section;

FIG. 31 is a cross sectional view of the portable computer to show the shape, which is from a third board section of the cable to the second board section;

FIG. 32 is a perspective view of the portable computer to show a state that the front cover and the keyboard are detached from the lower housing and the first containing section and the frame are exposed;

FIG. 33 is a cross sectional view of the portable computer to show a state that a floppy disk driving device and two hard disk driving devices are contained in the housing;

FIG. 34 is a plane view of the portable computer to show a state that the floppy disk driving device and two hard disk driving devices are contained in the housing;

FIGS. 35A and 35B show a second embodiment of the present invention;

FIG. 35A is a perspective view showing a positional relationship between an electric fan and the heat receiving part of the frame;

FIG. 35B is a perspective view of the electric fan;

FIG. 36 is a cross sectional view showing the positional relationship between the TCP and the heat receiving part of the frame in a third embodiment of the present invention;

FIG. 37 is a cross sectional view showing the positional relationship between the TCP and the heat receiving part of the frame in a fourth embodiment of the present invention;

FIG. 38 is a cross sectional view of the portable computer to show the shape, which is from a third board section of the cable to a first board section in a fifth embodiment of the present invention; and FIG. 39 is a cross sectional view of the portable computer to show the shape, which is from a third board section of the cable to a first board section in a sixth embodiment of the present invention.

DETAILED DESCRIPTION OF THE PREFERRED EMBODIMENTS

A first embodiment of the present invention will be explained with reference to FIGS. 1 to 34 applied to a portable computer.

Figure 1:
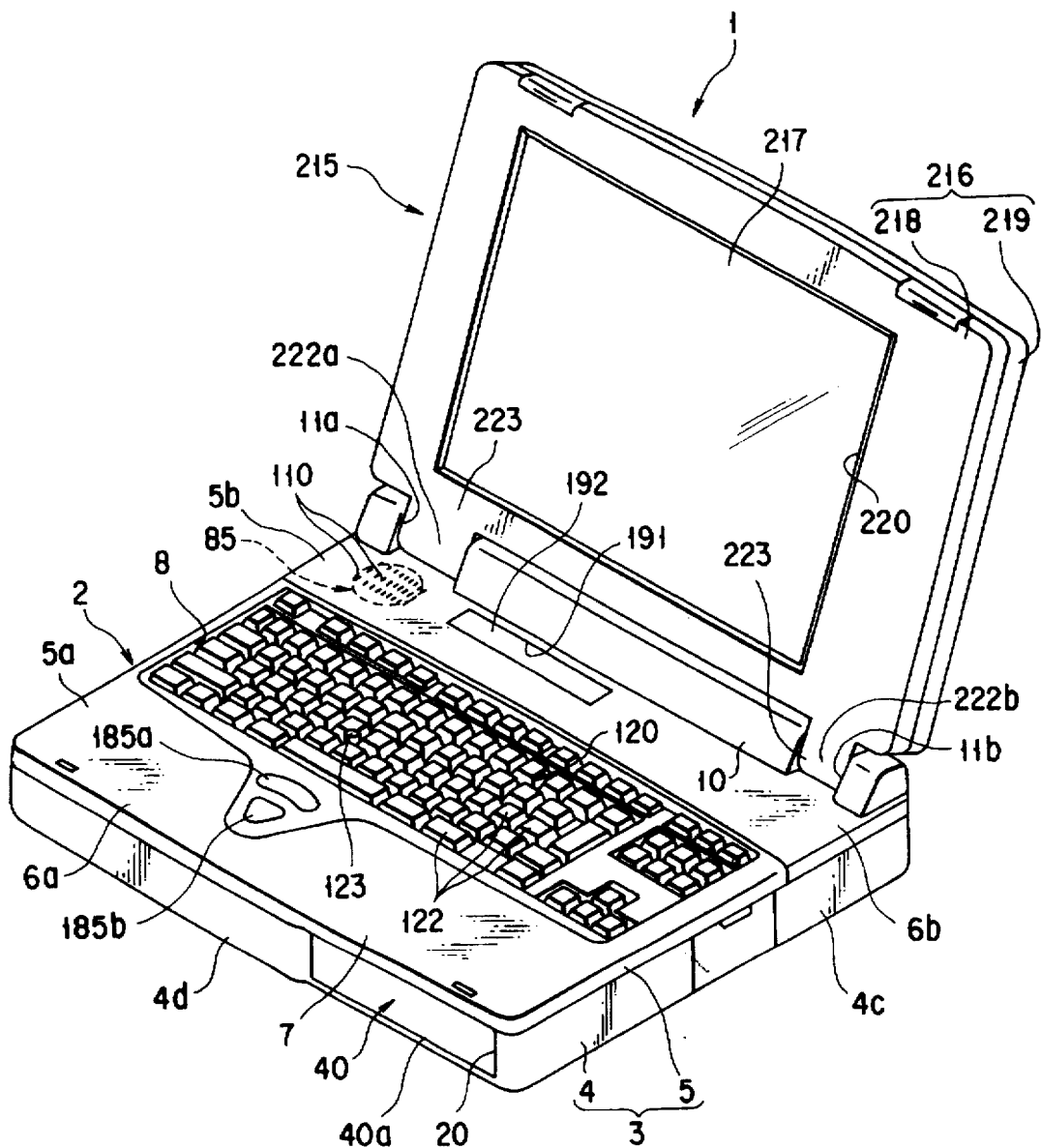

FIG. 1 shows a book-type portable computer 1. The computer 1 comprises a main body 2. The main body 2 comprises a flat and box-shaped housing 3. The housing 3 has a lower housing 4 and an upper housing 5. These lower and upper housings 4 and 5 are formed of a synthetic resin such as ABS resin.

Figure 2:
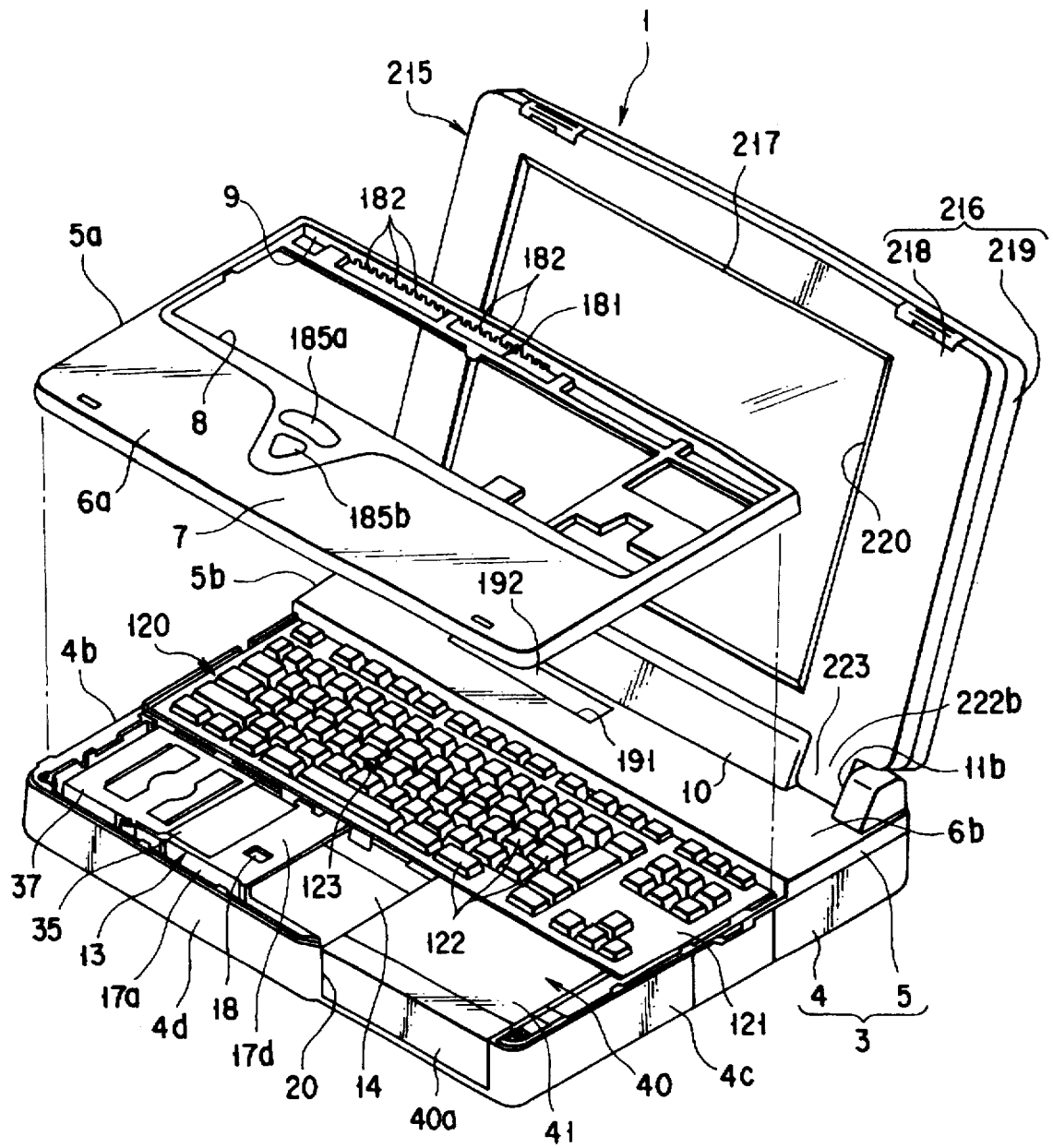
Figure 3:
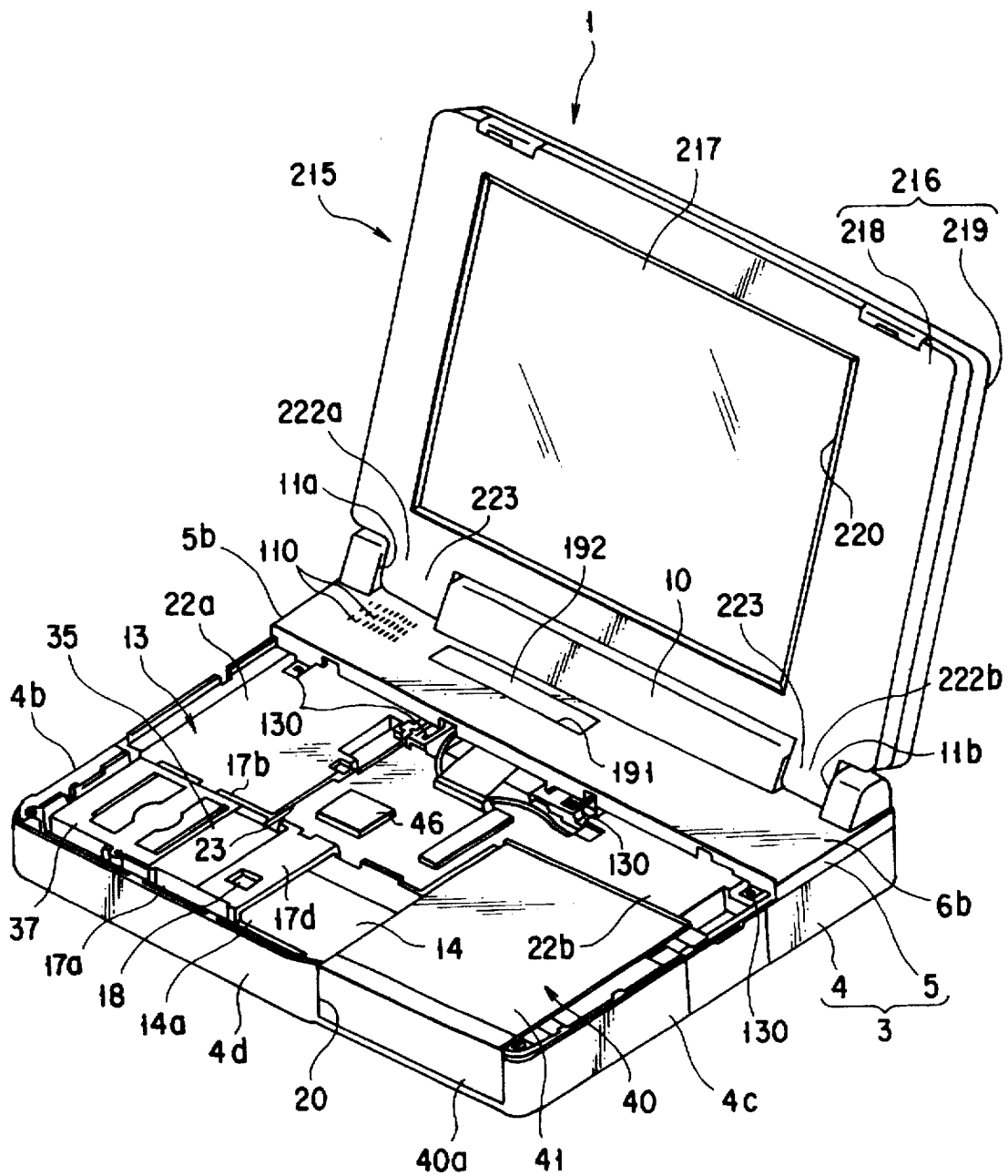
Figure 5:
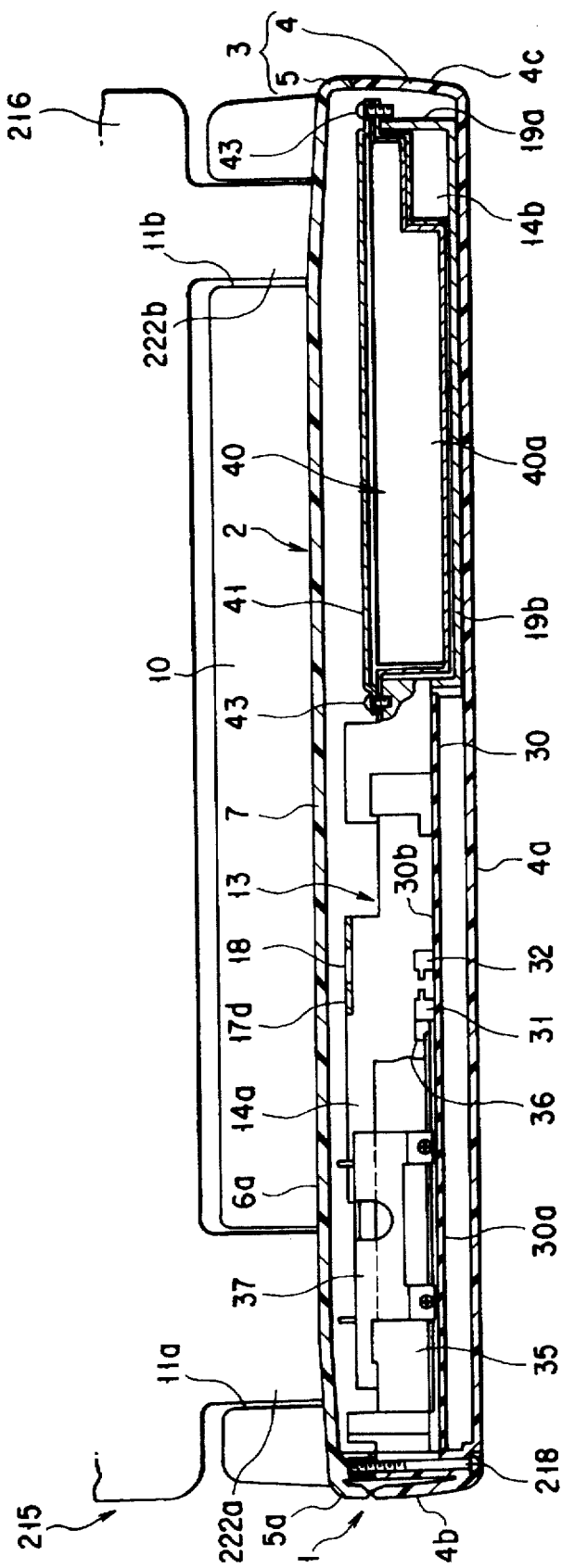

As shown in FIGS. 2, 3, and 5, the lower housing 4 has a flat bottom wall 4a, right and left side walls 4b and 4c, a front wall 4d, and a back wall 4e. The upper housing 5 is divided to a front section 5a and a rear section 5b. The front and rear sections 5a and 5b have flat upper walls 6a and 6b, serving as an upper surface of the housing 3. These upper walls 6a and 6b face to the bottom wall 4a of the lower housing 4.

The front half portion of the upper wall 6a of the front section 5a is formed to have an arm rest 7, and the back half portion of the upper wall 6a is formed to have a rectangular keyboard attaching port 8. The keyboard attaching port 8 has a size to extend over substantially the entire surface of the the back half portion of the upper wall 6a to be continuous to the housing 3. As shown in FIG. 2, a peripheral wall 9, which extends downward, is integrally formed over the entire circumference of the peripheral edge portion of the keyboard attaching port 8.

A hollow convex portion 10 is formed on the rear end portion of the upper wall 6b of the rear section 5b. The convex portion 10 extends along a width direction of the housing 3. The convex portion 10 comprises a pair of display supporting sections 11a and 11b. The display supporting sections 11a and 11b are formed to be spaced from each other in a width direction of the housing 3.

As shown in FIG. 3, a frame 13 is contained in the interior of the housing 3. The frame 13 is a die-cast molding, which is formed of a magnesium alloy, and has thermal conductivity. The frame 13 is formed to have a size to be just fitted to the inner side of the lower housing 4. Due to this, the frame 13 reinforces the housing 3 from its inner side so as to improve rigidity of the housing 3.

Figure 4:
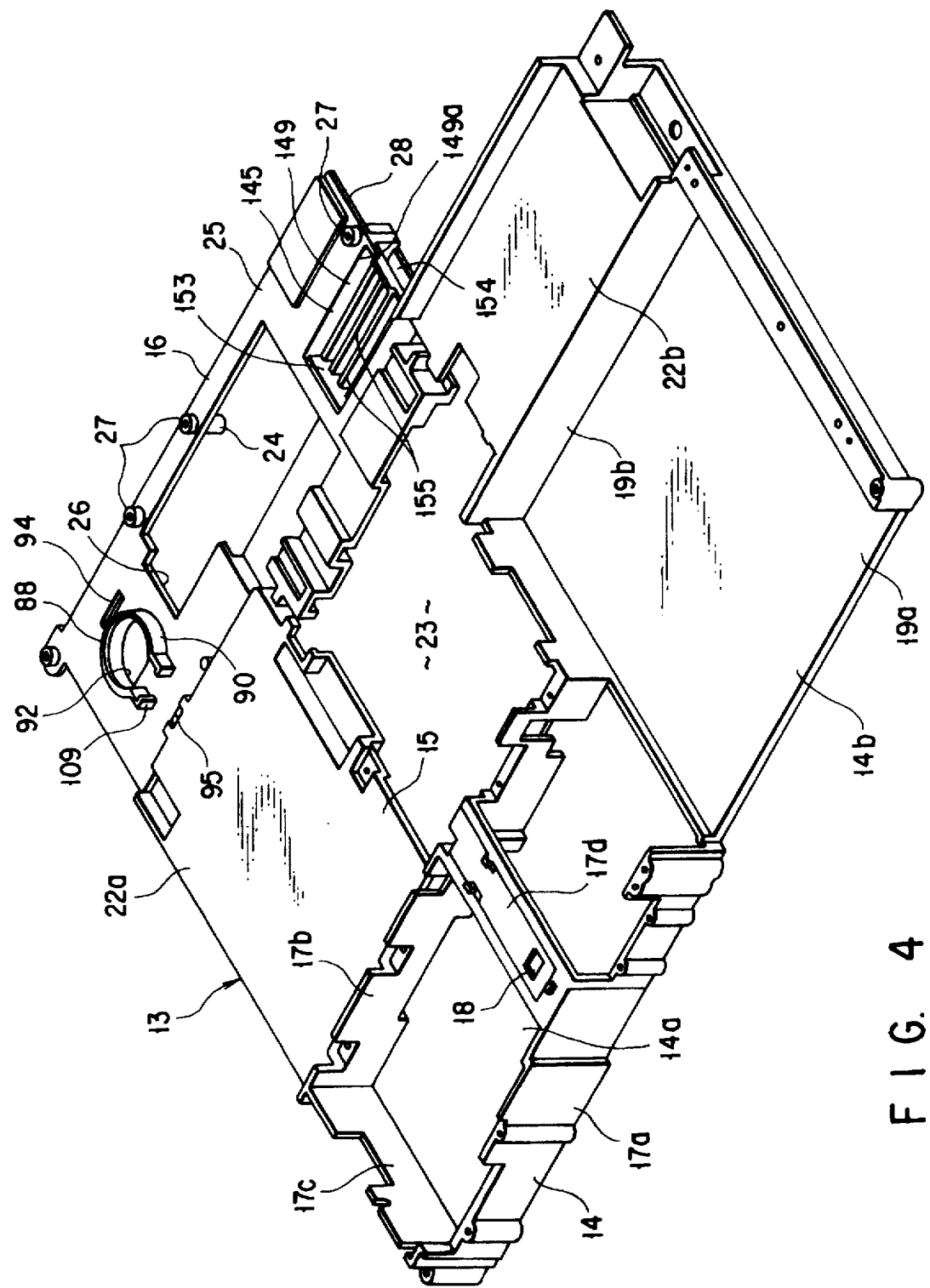

As shown in FIG. 4, the frame 13 integrally comprises a unit containing section 14, a keyboard supporting section 15, and a board supporting section 16. These unit containing section 14, the keyboard supporting section 15, and the board supporting section 16 are arranged to be flush with each other.

The unit containing section 14 is positioned at the front portion of the frame 13 to be extended along the width direction of the frame 13. The unit containing section 14 comprises a first containing section 14a and a second containing section 14b. The first containing section 14a has a front wall 17a, a back wall 17b, and a side wall 17c. The front and back walls 17a and 17b are extends in the width direction of the frame 13. The side wall 17c connecting between the front and back walls 17a and 17b. The first containing section 14a is positioned at the left half portion of the unit containing section 14. A switch supporting wall 17d is formed at an intermediate portion of the first containing section 14a. The switch supporting wall 17d is stretched between the upper end portion of the front wall 17a and the upper end portion of the back wall 17b. An inspection window 18 is formed in the switch supporting wall 17d.

The second containing section 14b is formed to be continuous to the right end portion of the first containing section 14a. The second containing section 14b comprises a bottom wall 19a and a peripheral wall 19b, which is continuous to the bottom wall 19a. The second containing section 14b is box-shaped to be opened to the upper and the forward portions of the frame 13. The bottom wall 19a of the second containing section 14b is mounted on the bottom wall 4a of the lower housing 4. The second containing section 14b is formed to be continuous to an opening 20, which is formed in the front wall 4d of the lower housing 4.

Figure 13:
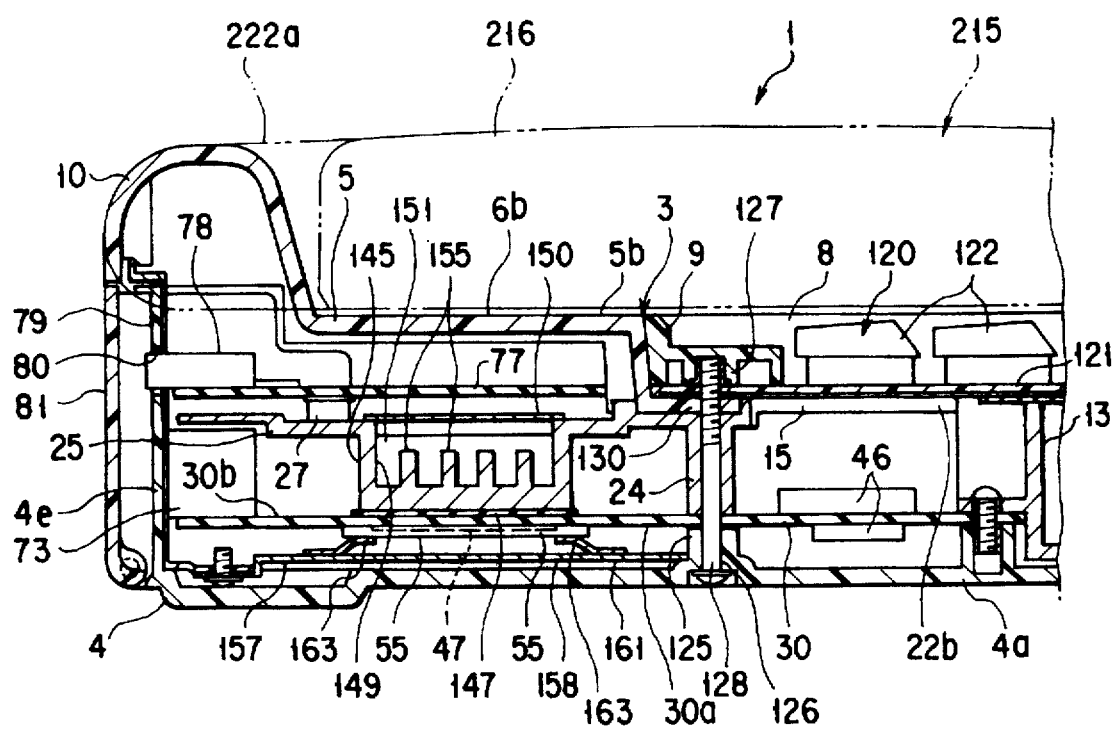

The keyboard supporting section 15 is formed to be continuous to the back end of the unit containing section 14. The keyboard supporting section 15 has a pair of supporting walls 22a and 22b, which are parallel to the bottom wall 4a of the lower housing 4. The supporting walls 22a and 22b are provided to be spaced from each other in the width direction of the frame 13. An insertion hole 23 for wiring is formed between the supporting walls 22a and 22b. The supporting walls 22a and 22b have a flat upper surface facing to the keyboard attaching port 8. Also, as shown in FIG. 13, boss portions 24, which extend downward, are integrally formed at the the lower surfaces of the supporting walls 22a and 22b.

The board supporting section 16 is formed to be continuous to the back end of the keyboard supporting section 15. The board supporting section 16 has a board supporting wall 25. The board supporting wall 25 is formed to be parallel to the bottom wall 4a of the lower housing 4, and to face to the upper wall 6b of the rear section 5b. The board supporting wall 25 is placed at the position closer to the bottom wall 4a than the supporting walls 22a and 22b. Then an opening portion 26 is formed at a central portion of the board supporting wall 25. A plurality of attaching basses 27 are formed on the upper surface of the board supporting wall 25. These attaching basses 27 are positioned around the opening portion 26. Also, the plurality of the boss portions 24 (only one is shown in FIG. 4), which extend downward, are integrally formed at the the lower surface of the board supporting wall 25.

A notch 28 is formed at the back end portion of the frame 13. The notch 28 is positioned at a corner, which is defined by the right end portion of the board supporting wall 25 and the back end of the second containing section 14b.

As shown in FIGS. 5 and 8, a circuit board 30 is contained in the lower housing 4. The circuit board 30 is interposed between the bottom wall 4a and the frame 13. The circuit board 30 is positioned over the range, which is from the first containing section 14a of the frame 13 to the circuit supporting section 16. The circuit board 30 has a lower surface 30a, serving as a first surface, and an upper surface 30b, serving as a second surface. The lower surface 30a of the circuit board 30 has a wiring pattern 54 (FIG. 12A). The lower surface 30a faces to the bottom wall 4a of the lower housing 4, and the upper surface 30b faces to the frame 13. Then, first and second hard disk connectors 31 and 32 are mounted on the upper surface 30b of the circuit board 30. The first and second hard disk connectors 31 and 32 are positioned at the lower portion of the switch supporting wall 17d of the first containing section 14a.

As shown in FIGS. 5 and 6, a hard disk driving device (hereinafter called HDD) 35 is contained in the first containing section 14a. The HDD 35, serving as a standard electronic apparatus, is provided in the computer 1 to be mounted on the upper surface 30b of the circuit board 30 at the left side of the switch supporting wall 17d. The HDD 35 has a connector 36 at its one end. The connector 36 is connected to the first hard disk connector 31.

A bracket 37, which is formed of sheet metal, is screwed to the HDD 35. The bracket 37 is used to detachably fix the HDD 35 to the first containing section 14a. As shown in FIG. 6, the bracket 37 is fixed to each of the front wall 17a and the back wall 17b with a plurality of screws 38.

The following will explain the steps of mounting the HDD 35 on the first containing section 14a.

First, the bracket 37 is screwed to the HDD 35. Then, the HDD 35 is inserted between the front wall 17a and the back wall 17b from the left side of the switch supporting wall 17d so as to be mounted on the upper surface 30b of the circuit board 30. In this state, an operator puts the tip of his finger on the bracket 37 to slide the HDD 35 right, thereby the connector 36 of the HDD 35 is connected to the first hard disk connector 31. In this case, the connecting portion between the HDD 35 and the first hard disk connector 31 is positioned at the lower portion of the switch supporting wall 17d. As a result, there occurs difficulty in seeing the connecting state between the HDD 35 and the first hard disk connector 31 due to the switch support wall 17d. However, according to this embodiment, since the switch supporting wall 17d has the inspection window 18, the connecting state between the HDD 35 and the first hard disk connector 31 can be confirmed through the inspection window 18.

After the connection between the connector 36 and the first hard disk connector 31 is finished, the bracket 37 is fixed to the first containing section 14a with the screws 38. Thereby, the HDD 35 is positioned at the circuit board 30, and the series of mounting steps of the HDD 35 is finished.

As shown in FIGS. 3, 5, and 6, a CD-ROM driving device 40 is contained in the second containing section 14b of the unit containing section 14. The CD-ROM driving device 40 has the same structure as the conventional device. Then, the CD-ROM driving device 40 comprises a flat box-shaped cabinet 41 having a disk containing section and a disk driving section. The cabinet 41 is fixed to the second containing section 14b with screws 43. The CD-ROM driving device 40 has a tray 40a in one end of the cabinet 41. The tray 40a is exposed to the opening portion 20 of the front wall 4d of the lower housing 4.

As shown in FIGS. 13 and 15, a QFP(quad flat package) 46 and a TPC (tape carrier package) 47, serving as circuit elements, are mounted on the circuit board 30. In the TCP 47, a large amount of heat is generated due to the high-speed performance and the large capacities in accordance with the need of the multifunctions of the computer 1. The TCP 47 is provided on the lower surface 30a of the back end portion of the circuit board 30 to be positioned at the lower portion of the right end of the board supporting section 16.

As shown in FIG. 12A, the TCP 47 comprises a carrier 48 formed of resin film, and an IC chip 49 supported by the carrier 48. The carrier 48 has a large amount of leads 50 formed of copper foil. These leads 50 are formed by etching. Each of the leads 50 has a first end exposed outside from the peripheral edge portion of the carrier 48, and a second end, which is placed at a position opposite to the first end.

The IC chip 49 has a first chip surface 49a and a second chip surface 49b, and is shaped to be substantially square. A plurality of bumps (not shown) are provided on the first chip surface 49a, and the second end of the leads 50 are bonded to these bumps. The connecting portion between the leads 50 and the bumps are sealed by potting resin 51. The potting resin 51 covers the first chip surface 49a of the IC chip 49. The second chip surface 49b of the IC chip 49 is exposed without being covered with the potting resin 51.

As shown in FIG. 12A, the TCP 47 is provided on the circuit board 30 in the so-called face-up attitude in which the first chip surface 49a of the IC chip 49 is directed to the opposite side of the circuit board 30. Due to this, the second chip surface 49b of the IC chip 49 faces to the lower surface 30a of the circuit board 30.

The second chip surface 49b of the IC chip 49 is bonded to the lower surface 30a of the circuit board 30 with adhesive 53 having thermal conductivity. The first end of the leads 50 of the IC chip 49 are soldered to the wiring pattern 54 of the lower surface 30a of the circuit board 30.

Figures 16, 17:
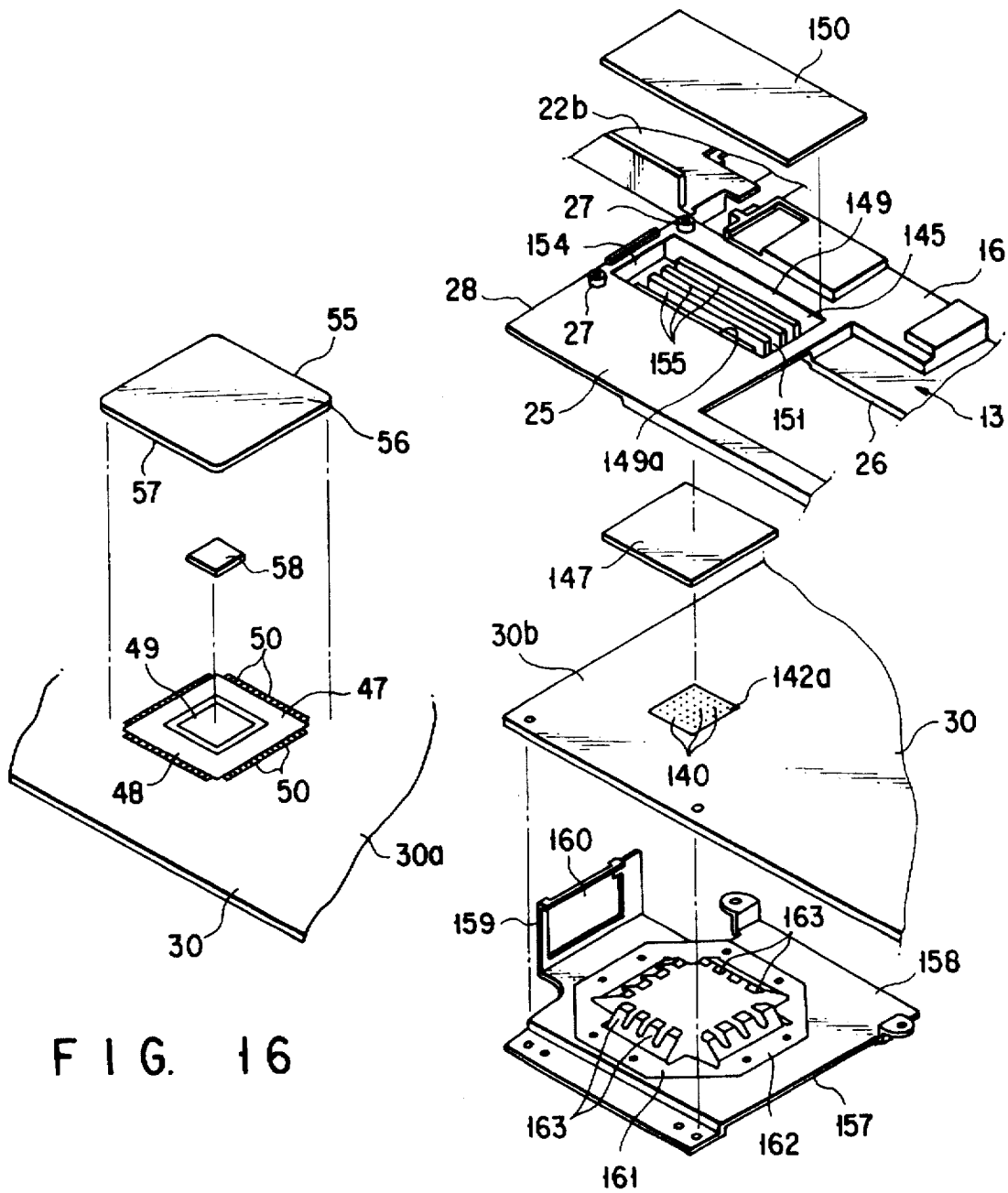

As shown in FIG. 12A or FIG. 16, a package cover 55 for protecting the TCP 47 is attached to the lower surface 30a of the circuit board 30. The package cover 55 comprises a square panel 56, which is formed of metal, and an insulation material 57, which is formed of synthetic resin, and which is bonded to the upper surface of the panel 56. The panel 56 has a size enough to cover the TCP 47 from the lower side, and the central portion of the upper surface faces to the IC chip 49. The insulation material 57 is formed to have a square rod shape along the peripheral edge portion of the panel 56. The insulation material 57 is bonded to the lower surface 30a of the circuit board 30, and surrounds the connecting portion between the lead 50 of the TCP 47 and the wiring pattern 54.

An elastic sheet 58 is provided between the panel 56 and the IC chip 49. The elastic sheet 58 is formed of rubber material, which is obtained by adding alumina to silicone resin, and has thermal conductivity. The elastic sheet 58 contacts each of the panel 56 and the IC chip 49 such that heat of the IC chip 49 is directly transmitted to the panel 56.

Figure 19:
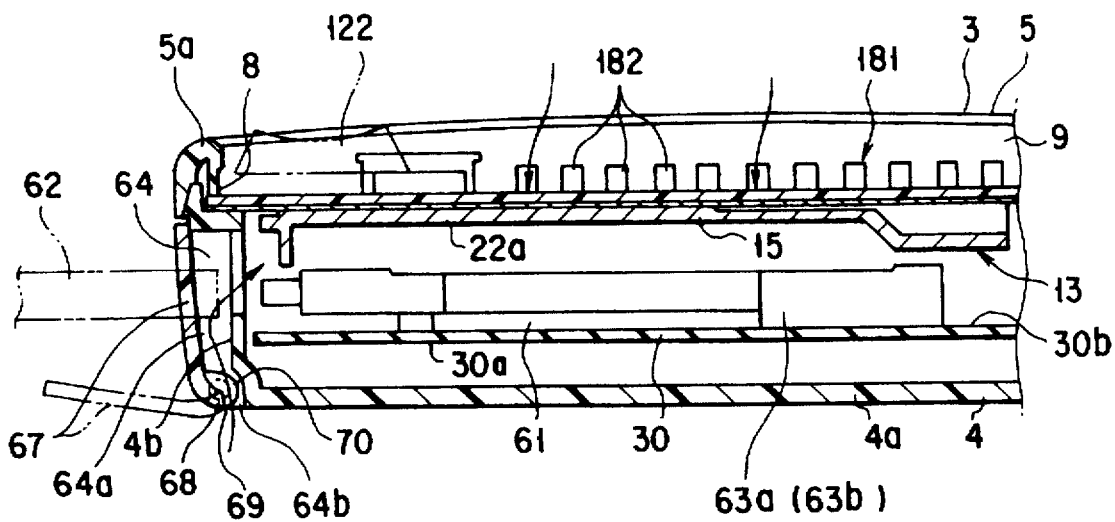

As shown in FIGS. 8 and 19, a card containing section 61 is formed between the keyboard supporting section 15 of the frame 13 and the circuit board 30. The card containing section 61 is used to detachably contain an expansion card 62 such as a PCMCIA (personal computer memory card international association) card or an interface card. The card containing section 61 comprises a pair of card connectors 63a and 63b to which the expansion card 62 is detachably connected. The card connectors 63a and 63b are arranged in a direction of the depth of the housing 3 on the upper surface 30b of the circuit board 30.

As shown in FIG. 19, the card containing section 61 comprises a card insertion port 64. The card insertion port 64 comprises a side opening 64a, which is formed in the side wall 4b of the left side of the lower housing 4, and a bottom opening 64b, which is formed in the bottom wall 4a of the lower housing 4. These openings 64a and 64b are communicated with each other. The card insertion port 64 is used to insert or discharge the expansion card 62, and faces to the card connectors 63a and 63b.

A card cover 67 for opening or closing the card insertion port 64 is attached to the lower housing 4. The card cover 67 is supported by the lower housing 4 to be rotatable between a first position where the card insertion port 64 is closed and a second position where the card cover 67 is inclined to the left side of the lower housing 4 such that the card insertion port 64 is opened. As shown in FIG. 19, the card cover 67 has an extension portion 68 inserted in the bottom opening 64b. The extension portion 68 has a slit 69. The slit 69 forms a gap 70 between the extension portion 68 and the bottom opening 64b in a state that the card cover 67 is rotated to the first position. The gap 70 is formed to be continuous to the interior of the housing 3. Since the gap 70 is covered with the housing 3 of the computer 1 in a state that the computer 1 is mounted on a top surface of a desk, the gap 70 cannot be seen from the external portion of the computer 1.

Figure 14:
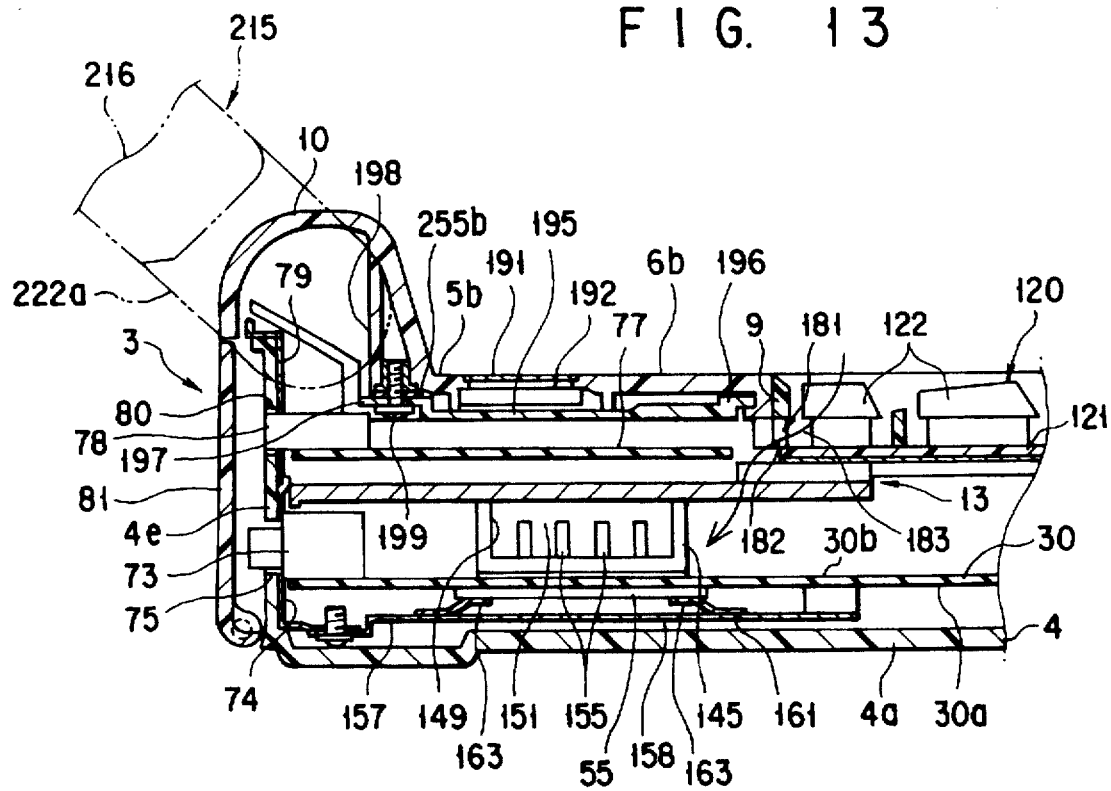

As shown in FIGS. 8, 13, and 14, an interface connector 73 and a first connector panel 74, which is formed of sheet metal to cover the connecting section between the interface connector 73 and the circuit board 30 from the back side, are attached to the back end portion of the upper surface 30b of the circuit board 30. The interface connector 73 is used to connect various kinds of peripheral device such as a printer, an external CRT display. The interface connector 73 is exposed to the back side of the housing 3 through a connector guiding hole 75 formed in the back wall 4e of the lower housing 4.

Since the computer 1 of this embodiment has the CD-ROM driving device 40 for dealing with a motion picture and voice data, an acoustic board 77 is provided as shown in FIGS. 13 to 15. The acoustic board 77 is detachably screwed to the attaching bosses 27 of the board supporting wall 25 to be positioned at the upper portion of the back end of the circuit board 30. The acoustic board 77 is electrically connected to the circuit board 30 through a stacking connector (not shown).

As shown in FIGS. 13 and 15, a plurality of jacks 78, and a second connector panel 79, which is formed of sheet metal to cover the connecting section between these jacks 78 and the acoustic board 77 from the back side, are attached to the back end portion of the acoustic board 77. The jacks 78 are exposed to the back side of the housing 3 through a plug hole 80 formed in the back wall 4e of the lower housing 4 so as to be used as a connection terminal of an external speaker or an input terminal of the voice, or an output terminal of the voice.

A connector cover 81 is attached to the back end portion of the lower housing 4. The connector cover 81 supported by the lower housing 4 to be rotatable between a first position where the interface connector 73 and the jacks 78 are covered and a second position where the connector cover 81 is inclined to the back side of the lower housing 4 such that the interface connector 73 and the jacks 78 are exposed.

Figures 9, 10, 11:
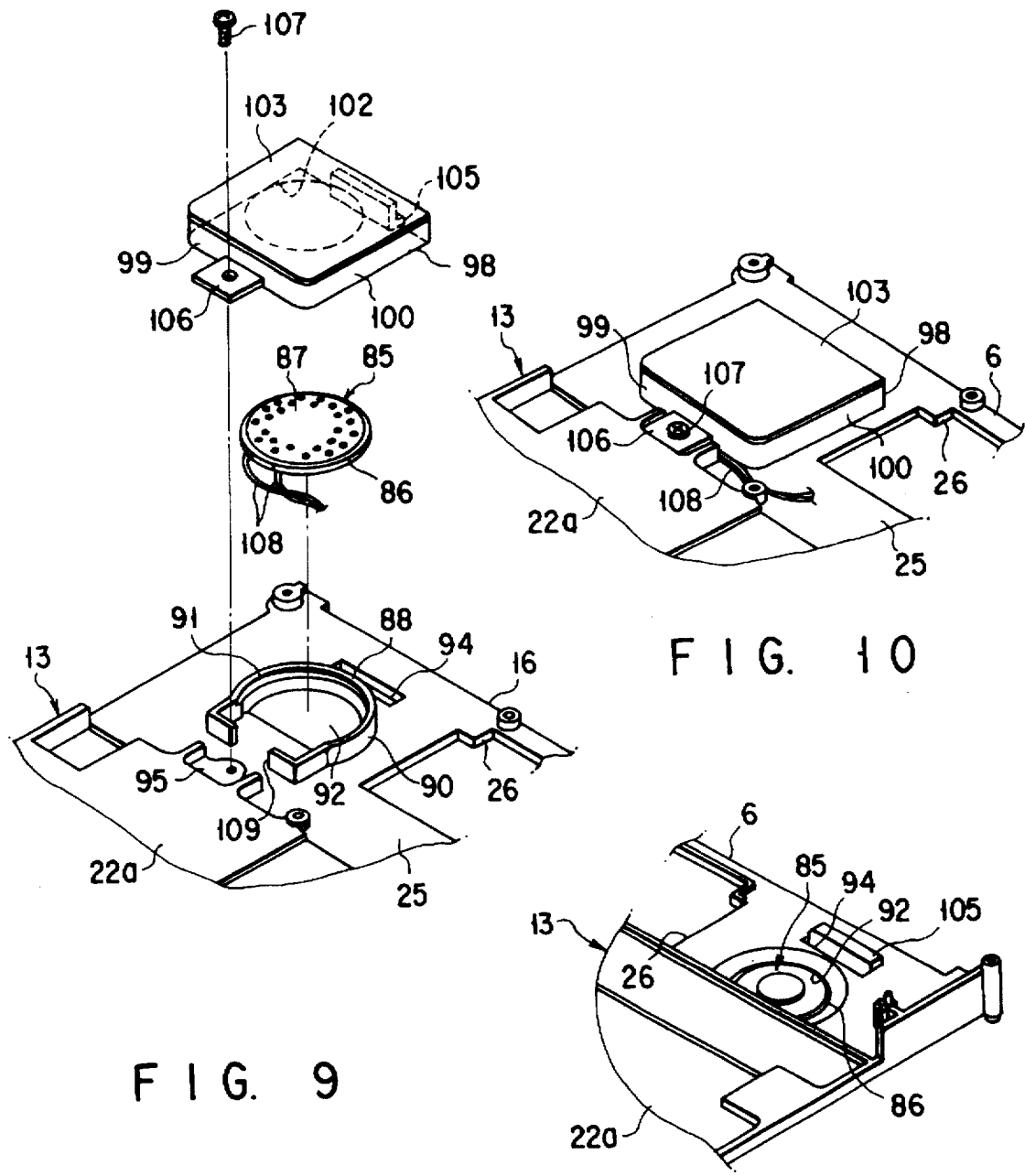

As shown in FIGS. 8 and 9, a speaker 85 for outputting voice is provided in the board supporting section 16 of the frame 13. The speaker 85 comprises a ring-shaped frame 86 for supporting a diaphragm (not shown), and a guard 87, which is fixed to the frame 86 to cover the diaphragm. The speaker 85 is entirely disk-shaped. The guard 87 is positioned at the front surface of the speaker 85, and the frame 86 is positioned at the back surface of the speaker 85.

As shown in FIGS. 9 to 11, a speaker supporting section 88 is provided on the board supporting section 16 of the frame 13. The speaker supporting section 88 has a speaker supporting wall 90 to be continuous to the upper surface of the board supporting wall 25. The speaker supporting wall 90 is substantially ring-shaped. On the top end portion of the speaker supporting wall 90, there is provided a concave portion 91 to which an outer peripheral portion of the speaker 85 is inserted. A communication hole 92 is formed in the upper surface of the board supporting wall 25 surrounded with the speaker supporting wall 90. The communication hole 92 faces to the frame 86 of the speaker 85.

An engaging hole 94 and a boss portion 95 are formed in the speaker supporting section 88. These engaging hole 94 and the boss portion 95 face to each other to sandwich the communication hole 92. As shown in FIG. 8 or 9, a speaker holder 98 is attached to the upper surface of the speaker supporting section 88. The speaker holder 98 has a holder main body 99 formed of synthetic resin. The holder main body 99 has a peripheral wall 100, which surrounds the speaker 85 and the speaker supporting wall 90, and an upper wall 101, which is formed to be continuous to the upper end of the peripheral wall 100. An insertion hole 102 to which the speaker 85 is inserted is formed in the central portion of the upper wall 101. A dust-proof cover 103 is adhered to the upper wall 101. The dust-proof cover 103 is formed of material, which is not prevented from the transmission of sound, such as nonwoven fabric or Japanese paper, and covers the insertion hole 102 from the upper side.

The holder main body 99 comprises an engaging piece 105, which is engaged with the engaging hole 94, and a tang piece 106, which is overlaid on the boss portion 95. Due to this, after the engaging piece 105 is engaged with the engaging hole 94, the tang piece 106 is coupled to the upper surface of the boss portion 95 with a screw 107. Thereby, the speaker holder 98 is fixed to the speaker supporting section 88. By fixing the speaker holder 98 to the speaker supporting section 88, the outer peripheral portion of the frame 86 of the speaker 85 is sandwiched between the concave portion 91 of the speaker supporting wall 90 and the opening peripheral edge portion of the insertion hole 102. Due to this, the speaker 85 is supported by the speaker supporting section 88 in a state that the guard 87 is directed to the dust-proof cover 103. In this case, the peripheral edge portion of the frame 86 of the speaker 85 is closely formed on substantially the entire circumference of the speaker supporting wall 90 without any gap. Then, the front surface side and the back surface side of the speaker 85 are divided through the speaker supporting wall 90.

As shown in FIG. 9, the speaker 85 has a pair of lead lines 108. The lead lines 108 are drawn to the outside of the speaker holder 98 through a notch 109 of the speaker supporting wall 90. The lead lines 108 are connected to the acoustic board 77 through a speaker connector (not shown).

Figure 25:
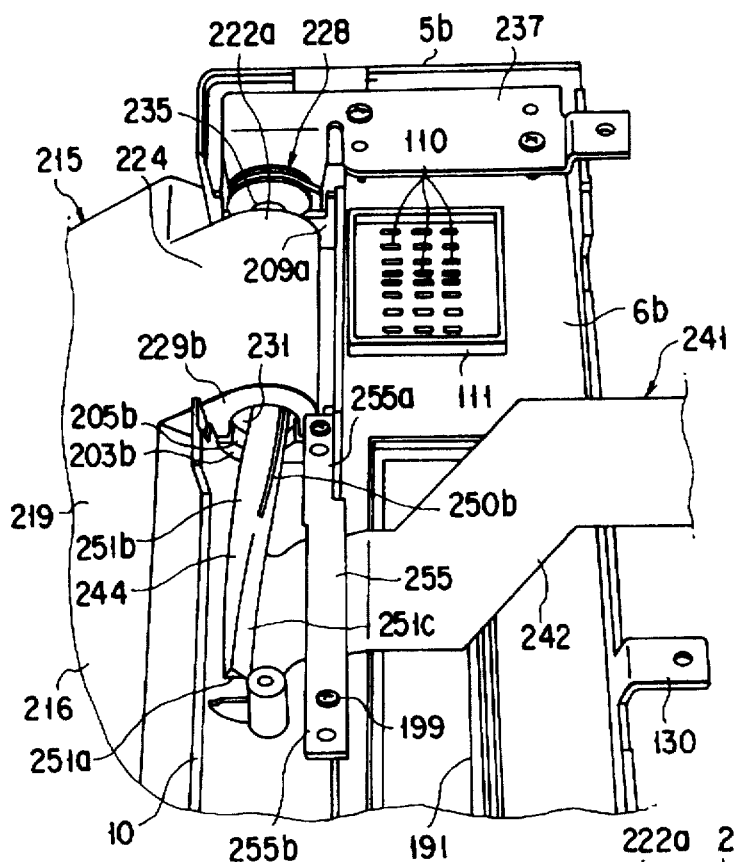

As shown in FIG. 1, the speaker 85 is positioned at the lower portion of the left end portion of the rear section 5b. As shown in FIG. 8, a large number of slit holes 110 are formed in the upper wall 6b of the rear section 5b. These holes 110 are used to emit sound, and face to the speaker 85. Then, as shown in FIGS. 8 and 25, a wall portion 111 is formed on the lower surface of the upper wall 6b to surround the holes 110. The lower end of the wall portion 111 comes in contact with the upper wall 101 of the speaker holder 98 through the dust-proof cover 103.

According to the attaching structure of the speaker 85, the peripheral edge portion of the frame 86 of the speaker 85 comes in contact with substantially the entire circumference of the speaker supporting wall 90 without any gap. Then, the front surface side and the back surface side of the speaker 85 are divided through the speaker supporting wall 90. Due to this, the voice can be divided to the voice emitted from the front surface of the speaker 85 and the voice emitted from the back surface of the speaker 85, so that interference of these voice can be prevented. Therefore, the voice emitted from the speaker 85 cannot be prevented from being canceled. Moreover, the voice having a specific frequency cannot be prevented from being lost. As a result, there can be obtained advantages in which quality of sound quality can be improved, and sound volume can be increased.

As shown in FIGS. 8 and 19, a keyboard 120 is mounted on the keyboard supporting section 15 of the frame 13. The keyboard 120 comprises a keyboard panel 121, a large number of keys 122 arranged on the upper surface of the keyboard panel 121, and a joy-stick 123, which is one kind of pointing devices. The keyboard panel 121 is rectangularly plate-shaped to have a size corresponding to the keyboard attaching port 8.

The lower housing 4 is covered with the front section 5a of the upper housing 5, so that the keyboard 120 is maintained between the front section 5a and the supporting walls 22a, 22b of the keyboard supporting section 15. In other words, as shown in FIG. 13, a plurality of fixing seat portions 125 (only one is shown) is provided to the bottom wall 4a of the lower housing 4. The fixing seat portions 125 face to the boss portions 24 of the frame 13. A screw hole 126 is formed in each of the fixing seat portions 125, and the screw holes 126 are opened to the bottom wall 4a.

As shown in FIG. 13, the front section 5a of the upper housing 5 has a plurality of screw receiving portion 127 (only one is shown). The screw receiving portions 127 face to the boss portions 24 at the frame 13. The screw receiving portions 127 are positioned at the front end portion of the front section 5a and the opening edge portion of the keyboard attaching port 8. A screw 128 is inserted to each of the screw holes 126 from the lower side of the keyboard attaching port 8. Each of the screws 128 is screwed into each of the screw receiving portions 127 through the circuit board 30 and the boss portions 24 of the frame 13. Thereby, the front section 5a and the lower housing 4 are connected to each other. In a state that the front section 5a and the lower housing 4 are connected to each other, the lower end portion of the peripheral wall 9 of the keyboard attaching port 8 contacts the peripheral edge portion of the keyboard panel 121 so as to be sandwiched between the supporting walls 22a and 22b of the keyboard supporting section 15. Thereby, the keyboard 120 is fixed to a predetermined position of the keyboard supporting section 15.

As shown in FIGS. 3 and 13, a plurality of tang pieces 130, which extend forward, is formed in the front end portion of the rear section 5b. The tang pieces 130 are arranged to have a space in a width direction of the rear section 5b. The tang pieces 130 are provided between the upper surfaces of the supporting walls 22a, 22b and the keyboard panel 121, respectively. Then, the screw 128 is passed through these tang pieces 130. Due to this, the rear section 5b is connected to the lower housing 4 through the screw 128.

If the screw 128 is loosened and detached from the screw receiving portion 127, the connection between the front section 5a and the lower housing 4 is released. Due to this, since only front section 5a can be detached from the lower housing 4, the unit containing section 14 can be exposed, so that a replacement of HDD 35 and an addition thereof can be carried out.

In the above-mentioned computer 1, the frame 13 is used as a heat sink in order to improve heat radiation performance of TCP 47. The following will explain the structure for improving heat radiation of TCP 47 with reference to FIGS. 12A to 19.

As shown in FIG. 12A, the circuit board 30 has a large number of through holes 140. The through holes 140 are arranged at the position corresponding to the mounting section of the TCP 47 to be passed through the circuit board 30 in the direction of the thickness. These through holes 140 have one end, which is opened to the lower surface 30a of the circuit board 30, and the other end, which is opened to the upper surface 30b of the circuit board 30. The one end of each of the through holes 140 faces to the second chip surface 49b of the IC chip 49. As shown in FIG. 12B, the inner surface of each of the through holes 140 is coated with a plating layer 141. As plating layer 141, copper plating having good thermal conductivity is used.

Heat conductive layers 142a and 142b, which are respectively coated with copper foil, are formed on the lower and upper surfaces 30a and 30b of the circuit board 30, respectively. Each of the heat conductive layers 142a and 142b is positioned at the opening portion of each of the through holes 140 to be continuous to the plating layer 141 of the inner surface of each of the through holes 140. Due to this, the IC chip 49 of the TCP 47 is adhered to the heat conductive layer 142a with the adhesive 53.

The board supporting section 16 of the frame 13 comprises a heat receiving part 145, which is projected downward. The heat receiving part 145 is formed to be integral with the frame 13 when the frame 13 is die-cast. The heat receiving part 145 is positioned above the TCP 47. The heat receiving part 145 comprises a flat heat receiving surface 146 facing to the heat conductive layer 142b of the upper surface 30b of the circuit board 30. The heat receiving surface 146 is rectangularly shaped to extend in the width direction of the frame 13. An area of the heat receiving surface 146 is set to be considerably larger than that of a contact portion between the IC chip 49 and the circuit board 30. An area of a contact portion between the heat receiving surface 146 and the circuit board 30 is sufficiently ensured. An elastic sheet 147 is sandwiched between the upper surface 30b of the circuit board 30 and the heat receiving surface 146. The elastic sheet 147 is formed of rubber material, which is obtained by adding alumina to silicone resin. Also, the elastic sheet 147 has thermal conductivity. Due to this, the upper surface 30b of the circuit board 30 comes in contact with the heat receiving surface 146 through the elastic sheet 147.

The heat receiving part 145 has a concave portion 149. The concave portion 149 has an opening portion 149a opened to the board supporting wall 25. As shown in FIGS. 15 and 17, the concave portion 149 extends in the width direction of the frame 13. A cover 150 is adhered to the upper surface of the board supporting wall 25. The cover 150 is used to close an opening portion 149a of the concave portion 149. The cover 150 is formed of synthetic resin material, which is different from the material used in the frame 13. Moreover, the cover 150 is rectangularly plate-shaped. The cover 150 forms a cooling air passage 151 in cooperation with the inner surface of the concave portion 149. The cooling air passage 151 is cylindrically formed to be hollow, and extends in the width direction of the frame 13. The cooling air passage 151 faces to the TCP 47 to sandwich the circuit board 30 therebetween.

As shown in FIGS. 4 and 15, the cooling air passage 151 has a cooling air inlet 153, and a cooling air outlet 154. The cooling air inlet 153 and the cooling air outlet 154 face to each other along the width direction of the frame 13. Seeing the frame 13 forward, the cooling air inlet 153 is positioned at the left end portion of the concave portion 149. The cooling air inlet 153 is opened to the left side of the frame 13 in the lower portion of the board supporting wall 25. The cooling air outlet 154 is positioned at the right end portion of the concave portion 149. The outlet 154 is opened to the notch 28 of the frame 13.

As shown in FIG. 12A, the concave portion 149 has a bottom surface 149b facing to an opening portion 149a. The bottom surface 149b is positioned above the heat receiving surface 146. A plurality of heat radiation fins 155 is formed in the bottom surface 149b as one unit. The heat radiation fins 155 are positioned at the cooling air passage 151. These heat radiation fins 155 extend along the passage direction of the cooling air passage 151 so as to be placed to have a space in the depth direction of the frame 13.

As shown in FIGS. 15 and 17, a bracket 157, which is made of sheet metal, is provided at the lower side of the TCP 47. The bracket 157 has a flat main portion 158, which faces to the lower surface 30a of the circuit board 30, and a raise wall 159, which is continuous to one end of the main portion 158. The main portion 158 is screwed to the boss portions 24 of the board supporting section 16 and the lower end portion of the first connector panel 74. The raise wall 159 is positioned at the end portion of the cooling air outlet 154 of the cooling air passage 151. A communication hole 160, which is continuous to the cooling air outlet 154, is opened to the raise wall 159. An upper end edge portion of the communication hole 160 is engaged with the right end portion of the board supporting section 16. Due to this, the bracket 157 is supported by the frame 13.

A spring member 161 is attached to the upper surface of the bracket 157. The spring member 161 is formed of a thin copper plate having thermal conductivity. The spring member 161 has a base portion 162, which is formed to have a square rod shape, and which is caulked to the upper surface of the main portion 158, and a plurality of pushing pieces 163 extending upward from the base portion 162. The pushing pieces 163 are elastically deformable up and down, and have a spring property. As shown in FIG. 12A, the top end portion of each of the pushing pieces 163 is brought into contact with the panel 56 of the package cover 55. Thereby, the circuit board 30 is pushed upward, and the elastic sheet 147 comes in contact with the heat receiving surface 146 of the heat receiving part 145 without any gap.

Figure 18:
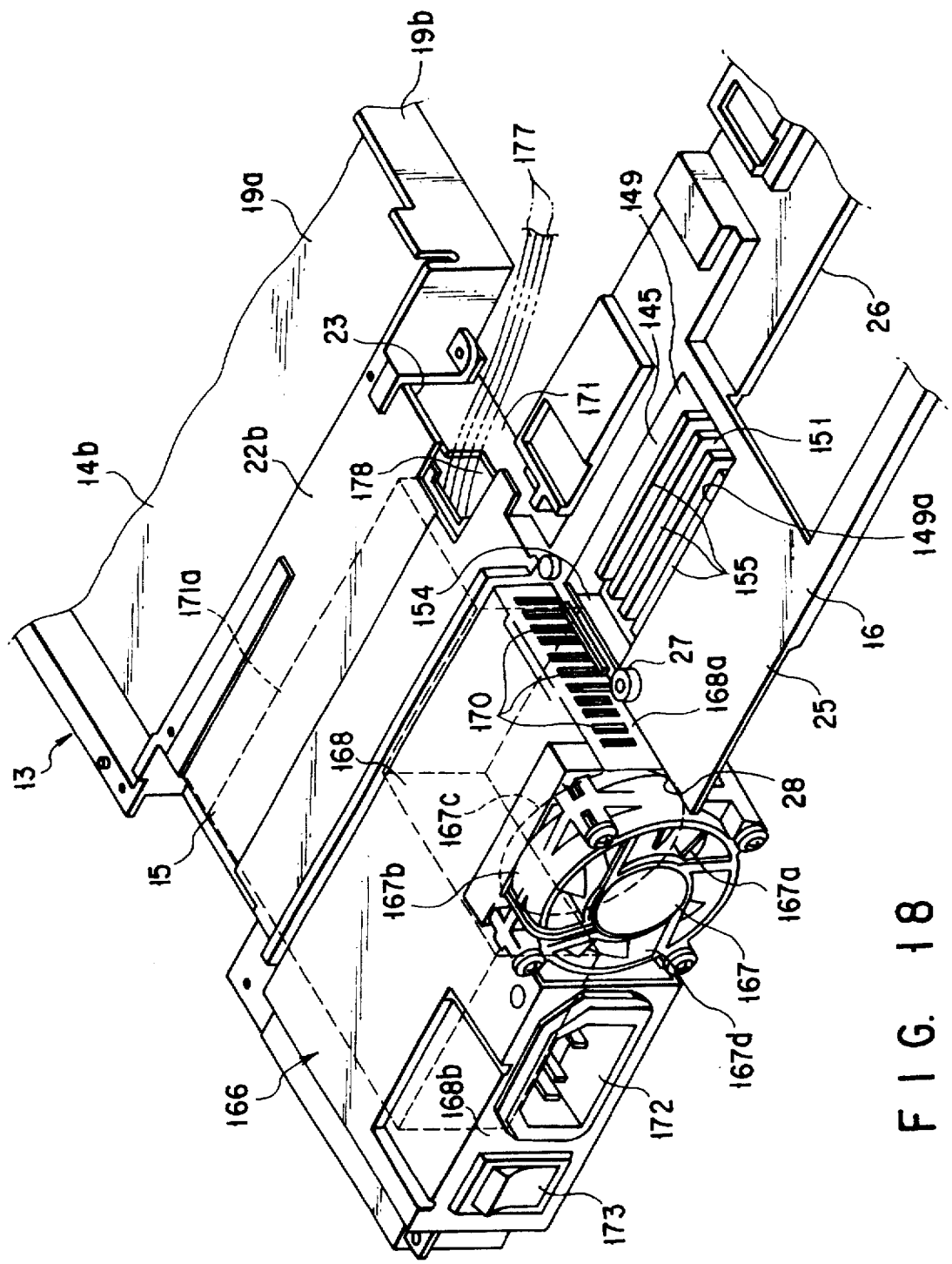

As shown in FIG. 15, a fan unit 166 is contained in the lower housing 4. As shown in FIG. 18, the fan unit 166 comprises a motor fan 167 and a fan casing 168, which is continuous to the motor fan 167. The motor fan 167 has a fan blade 167a, which is rotatably driven, and a fan frame 167b for containing the fan blade 167a. An absorption port 167c and a discharge port 167d are opened to the fan frame 167b. The absorption port 167c and the discharge port 167d face to each other to sandwich the fan blade 167a therebetween. The fan casing 168 is hollow box-shaped to have a size enough to be inserted to the notch 28 of the frame 13. The absorption port 167c is opened to the interior of the fan casing 168. The fan casing 168 has a side surface 168a, which is adjacent to the board supporting section 16, and a back surface 168b, which is adjacent to the back wall 4e of the lower housing 4.

A plurality of inhalation ports 170 are opened to a side surface 168a of the fan casing 168. Each of the inhalation ports 170 has a first opening portion 170a and a second opening portion 170b, which is continuous to the first opening portion 170a. The first opening portion 170a is formed to be continuous to the cooling air outlet 154 of the cooling air passage 151 through the communication hole 160 of the bracket 157. The second opening portion 170b is opened to the interior of the lower housing 4. The motor fan 167 is positioned at a corner, which is defined by the side surface 168a and the back surface 168b of the fan casing 168, to be adjacent to the inhalation ports 170. Due to this, as shown by an arrow of in FIG. 15, if the motor fan 167 is driven, air is absorbed to the inside of the fan casing 168 through the inhalation ports 170, and discharged to the exterior of the housing 3 from the discharge port 167d of the motor fan 167.

Figure 22:
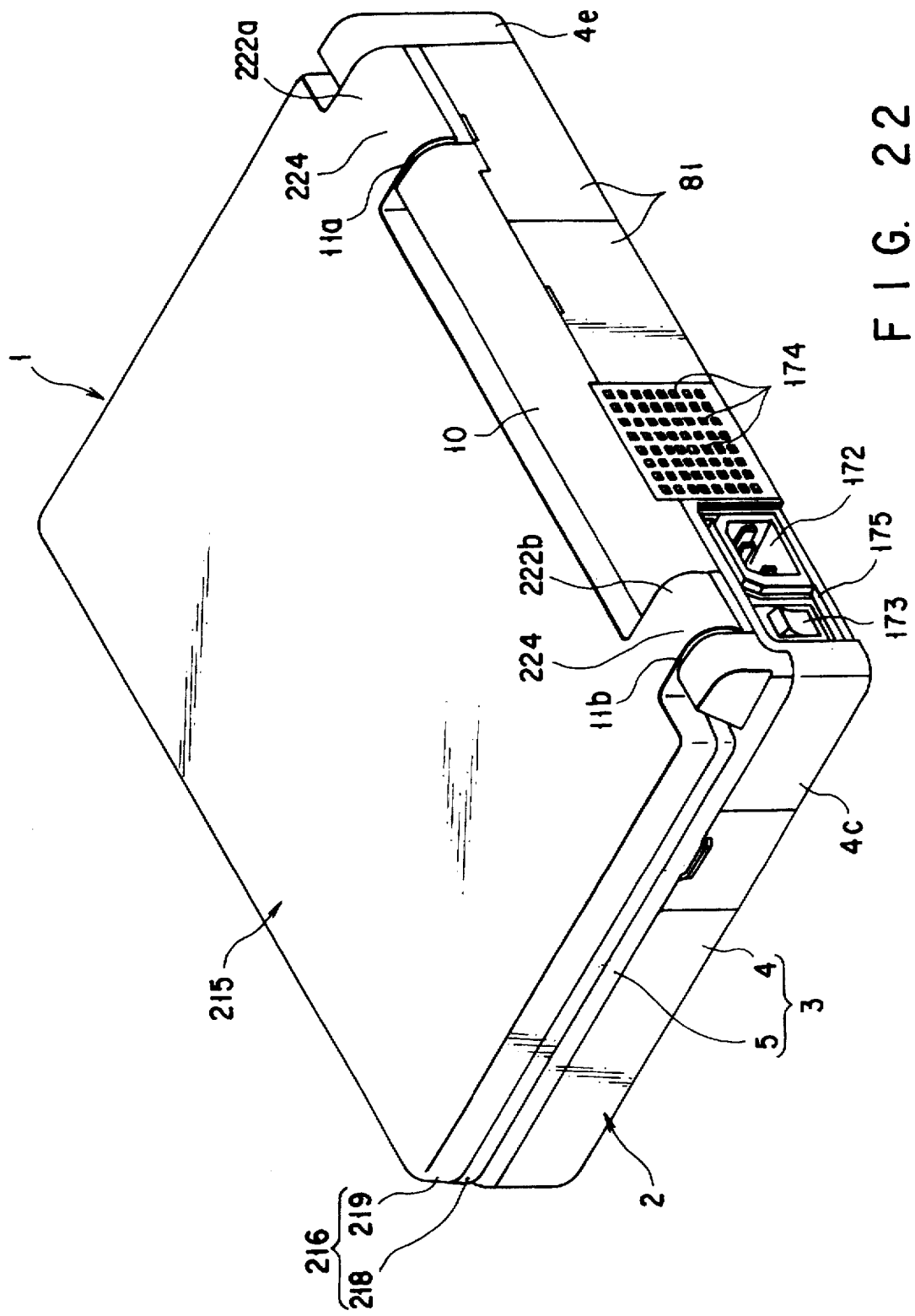

As shown in FIG. 18, the fan casing 168 comprises a power source containing section 171 as one unit. The power source containing section 171 is positioned at the lower portion of the right end portion of the keyboard supporting section 15. A power unit 171a, which generates heat while operating, is contained in the power source containing section 171. The power unit 171a comprises a power connector 172 to which commercial power is supplied through a power plug, and a power switch 173. The power switch 173 is electrically connected to the motor fan 167. If the power switch 173 is turned on, the motor fan 167 is driven. The power connector 172 and the power switch 173 are provided on the back surface 168b of the fan casing 168 to be adjacent to the motor fan 167. Due to this, as shown in FIG. 22, a plurality of exhaust ports 174 and an opening portion 175 are opened to the back wall 4a of the lower housing 4. The exhaust ports 174 are formed to face to the discharge port 167d of the motor fan 167, and the opening portion 175 is formed to expose the power connector 172 and the power switch 173. As shown in FIG. 18, the power unit 171a has a lead line 177. The lead line 177 is guided to the upper surface 30b of the circuit board 30 through an outlet port 178, which is formed at the side surface of the power source containing section 171. The lead line 177 is connected to the circuit board 30 through a connector (not shown).

As shown in FIGS. 2, 14, and 19, a cooling air inlet port 181 is formed on the peripheral wall 9, which is continuous to the keyboard attaching port 8. The cooling air inlet 181 has a large number of notches 182. The notches 182 are arranged in the width direction of the keyboard attaching port 8 to have a space. These notches 182 are opened to the lower end of the peripheral wall 9. Due to this, the cooling air inlet port 181 is shaped like coarse-teeth. As shown in FIG. 2, the cooling air inlet port 181 is positioned at substantially the left half of the keyboard attaching port 8. In other words, the cooling air inlet port 181 is positioned at the upper side of the front end portion of the board supporting wall 25. Due to this, the cooling air inlet port 181 is positioned at the opposite side of the inhalation ports 170 of the motor fan 167 to sandwich the cooling air passage 151 therebetween, that is, the cooling air inlet port 181 is positioned to be biased to the side close to the cooling air inlet port 153 of the cooling air passage 151.

As shown in FIG. 14, the cooling air inlet port 181 is positioned just after keys 122 of the last column of the keyboard 120, and covered with these keys 122 from the front side. A space 183 is formed between the peripheral wall 9 having the cooling air inlet port 181 and the keys 122. The space 183 is formed to be continuous to the cooling air inlet port 181. Due to this, if the motor fan 167 is driven, air of the outside of the housing 3 is absorbed to the cooling air inlet port 181 through the space 183. Air, serving as cooling air, is guided to the inside of the housing 3 as shown in an arrow of FIG. 14.

Figure 20:
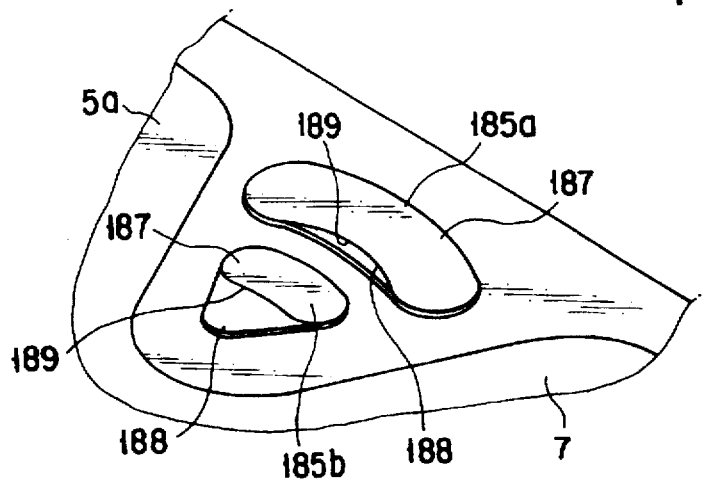
Figure 21:
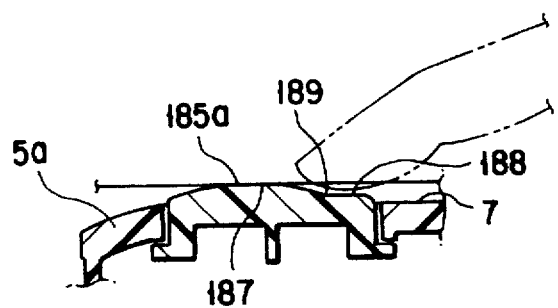

As shown in FIGS. 1 and 20, a pair of click switch buttons 185a and 185b is formed at substantially the central portion of the arm rest 7 of the housing 3. The click switch buttons 185a and 185b are positioned at the upper portion of the switch supporting wall 17d of the frame 13 so as to be used to be pressed by the tip of the operator's hand in executing or canceling a command.

As shown in FIG. 6, click switches 186a and 186b are provided at the upper surface of the switch supporting wall 17d. The click switches 186a and 186b are turned on/off by the click switch buttons 185a and 185b. Each of the click switch buttons 185a and 185b have a press surface 187 and a guide surface 188 (FIG. 21, one of the switches is typically shown). The press surface 187 is formed to have a circular arc, and slightly projected as compared with the upper surface of the arm rest 7. The guide surface 188 is formed to be continuous to the back end portion of the press surface 187. The guide surface 188 is substantially horizontally extended from the back end portion of the press surface 187. The guide surface 188 is positioned on the same plane as the upper surface of the arm rest 7. A finger non-slip portion 189 having a level difference is formed at the boundary portion between the press surface 187 and the guide surface 188. The finger non-slip portion 189 is used to put the tip of operator's finger thereon at the time of the click operation of the click switch buttons 185a and 185b. By the presence of the finger non-slip portion 189, the tip of the finger is prevented from being slid at the time of the click operation.

As shown in FIG. 1, a display window 191 is formed on the upper wall 6b of the rear section 5b of the housing 3. The display window 191 is rectangularly shaped to extend in the width direction of the rear section 5b. The display window 191 is adjacent to the display supporting section 11a. A liquid crystal display panel 192 is inserted to the display window 191. The liquid crystal display panel 192 is used to display the operation state of the computer 1 and the contents of the functions. The liquid crystal display panel 192 is formed to be exposed to the upper surface of the housing 3 through the display window 191.

Figure 26:
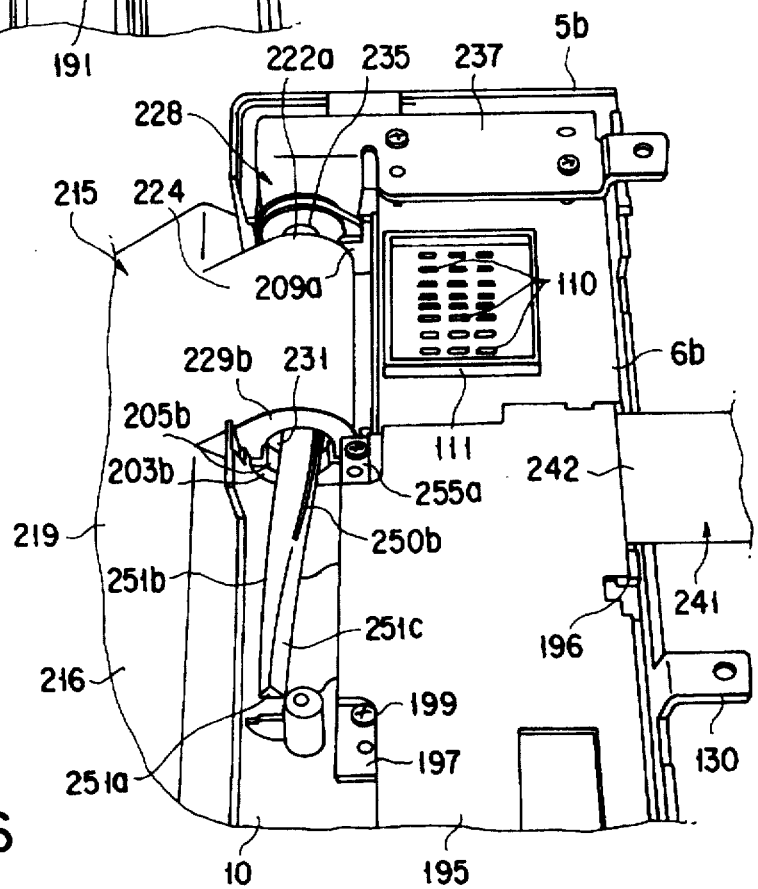

As shown in FIGS. 14 and 26, a panel holder 195 is attached to the back side of the upper wall 6b of the rear section 5b. The panel holder 195 is rectangularly plate-shaped to cover the liquid crystal panel 192 from the lower side. The panel holder 195 comprises a front edge section having an engaging piece 196 and a back edge section having a plurality of supporting pieces 197. The engaging piece 196 of the panel holder 195 is detachably engaged with the front end portion of the rear section 5b. Each of the supporting pieces 197 of the panel holder 195 is screwed to a boss portion 198 of the rear section 5b with a screw 199. Due to this, the panel holder 195 is overlaid on the back surface of the upper wall 6b, and holds the liquid crystal display panel 192 therebetween.

Figure 23:
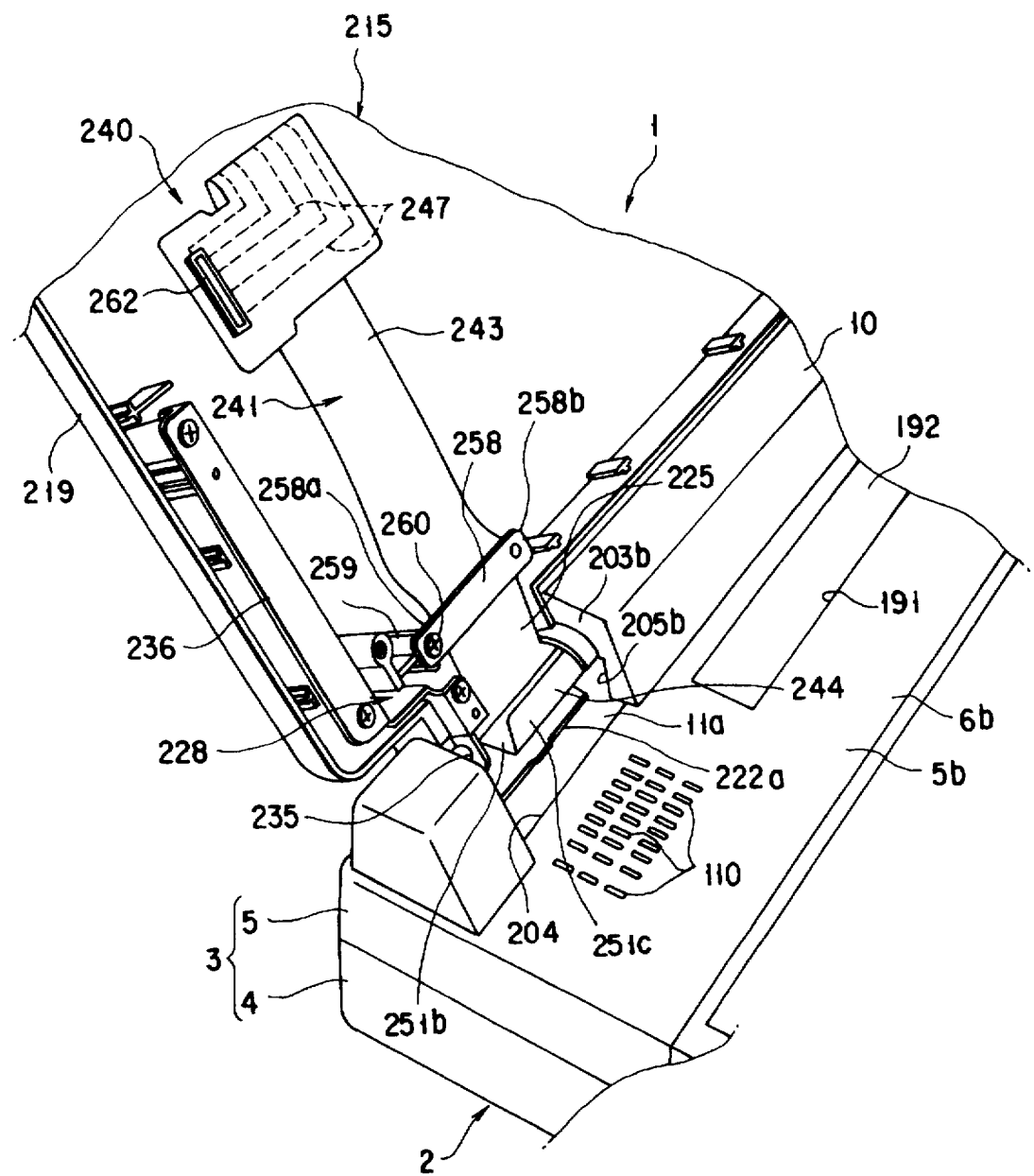

As shown in FIGS. 5 and 23, the display supporting sections 11a and 11b of the rear section 5b are structured at the recess, which is continuously opened to the front, upper and rear portions of each of the convex portions 10. Since these display supporting sections 11a and 11b have the structure common to each other, the display supporting section 11a on the left side will be typically explained.

As shown in FIGS. 23 and 24, the display supporting section 11a comprises a pair of side surfaces 203a and 203b, and a bottom opening 204 provided between these side surfaces 203a and 203b. The bottom opening 204 is continuous to the interior of the rear section 5b. The side surfaces 203a and 203b have side openings 205a and 205b. The side openings 205a and 205b are continuous to the bottom openings 204 and the interior of the convex portion 10.

A cover 207 is attached to the display supporting section 11a from the inner side of the rear section 5b. The cover 207 comprises a bottom wall portion 208 covering the bottom opening 204, and a pair of side wall portions 209a and 209b, which are inserted to the side openings 205a and 205b. The side wall portions 209a and 209b form insertion holes 210a and 210b in the side surfaces 203a and 203b of the display supporting section 11a in cooperation with the side openings 205a and 205b.

As shown in FIG. 1, a display unit 215 is supported on the display supporting sections 11a and 11b of the housing 3. The display unit 215 comprises a flat and box-type display housing 216, and a color liquid crystal display 217 contained in the display housing 216. The display housing 216 has a front panel 218 and a rear panel 219 coupled to the front panel 218. An opening 220 is formed in the front panel 218 to expose the color liquid crystal display 217.

Figure 31:
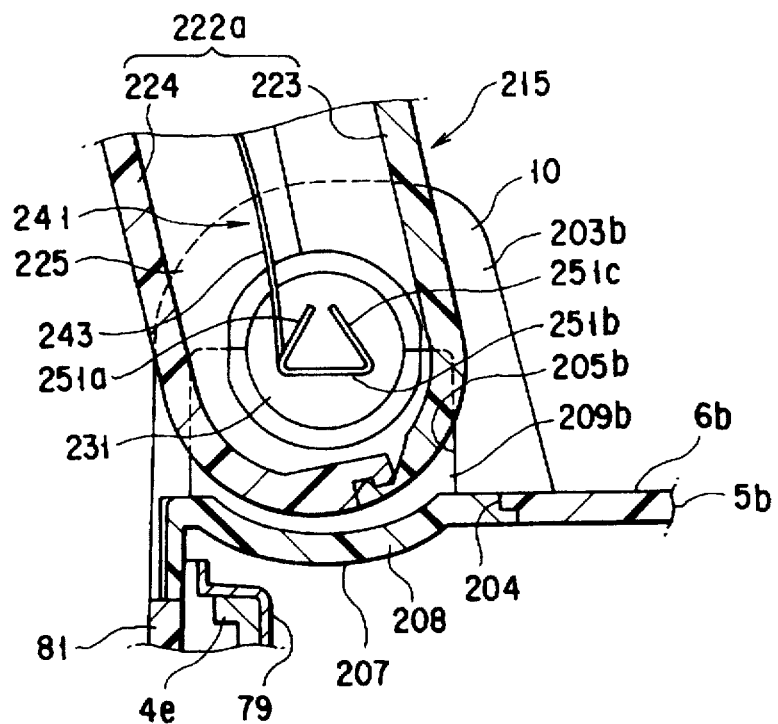

Also, the display housing 216 comprises a first coupling section 222a and a second coupling section 222b. As shown in FIGS. 25 and 31, the first and second coupling sections 222a and 222b are structured such that a front section 223 continuous to the front panel 218 and a rear section 224 continuous to the rear panel 219 are formed to face to each other. Due to this, the first and second coupling sections 222a and 222b are formed to be hollow. The interior of the first coupling section 222a serves as a cable passage 225, which is continuous to the inner space of the display housing 216, as shown in FIGS. 23 and 24.

The first and second coupling sections 222a and 222b are rotatably supported by the display supporting sections 11a and 11b through a hinge device 228, respectively. The supporting structure will be explained in a case where the first coupling section 222a is typically shown. As shown in FIGS. 24 to 26, the first coupling section 222a has a pair of side surfaces 229a and 229b. The side surface 229a faces to the side surface 203a of the display supporting section 11a. The side surface 229b faces to the side surface 203b of the display supporting section 11a. A hinge insertion hole 230 is formed in the side surface 229a of the fist coupling section 222a. The hinge insertion hole 230 faces to the insertion hole 210a of the display supporting section 11a. A communication hole 231 is formed in the side surface 229b of the first coupling section 222a. The communication hole 231 is continuous to the cable passage 225 and the insertion hole 210b of the side surface 203b.

The hinge device 228 comprises a hinge shaft 235, a first bracket 236, which is fixed to a first end of the hinge shaft 235, and a second bracket 237, which is pivotally connected to a second end of the hinge shaft 235. The hinge shaft 235 is provided to be passed through the insertion hole 210a and the hinge insertion hole 230. The first end of the hinge shaft 235 is guided to the interior of the first coupling section 222a. The first bracket 236 of the first end of the hinge shaft 235 is screwed to the rear section 224 of the first coupling section 222a and the rear panel 219 of the display housing 216. The second end of the hinge shaft 235 is guided to the left end portion of the convex portion 10. The second bracket 237 of the second end of the hinge shaft 235 is screwed to the rear section 5b. Due to this, the hinge shaft 235 serves as a rotation fulcrum of the display unit 215. Thereby, the display unit 215 is supported by the housing 3 to be rotatable between a closing position where the arm rest 7 and the keyboard 120 is covered from the upper side and an opening position where the color liquid crystal display 217 is raised at the back portion of the keyboard 120.

Figure 27:
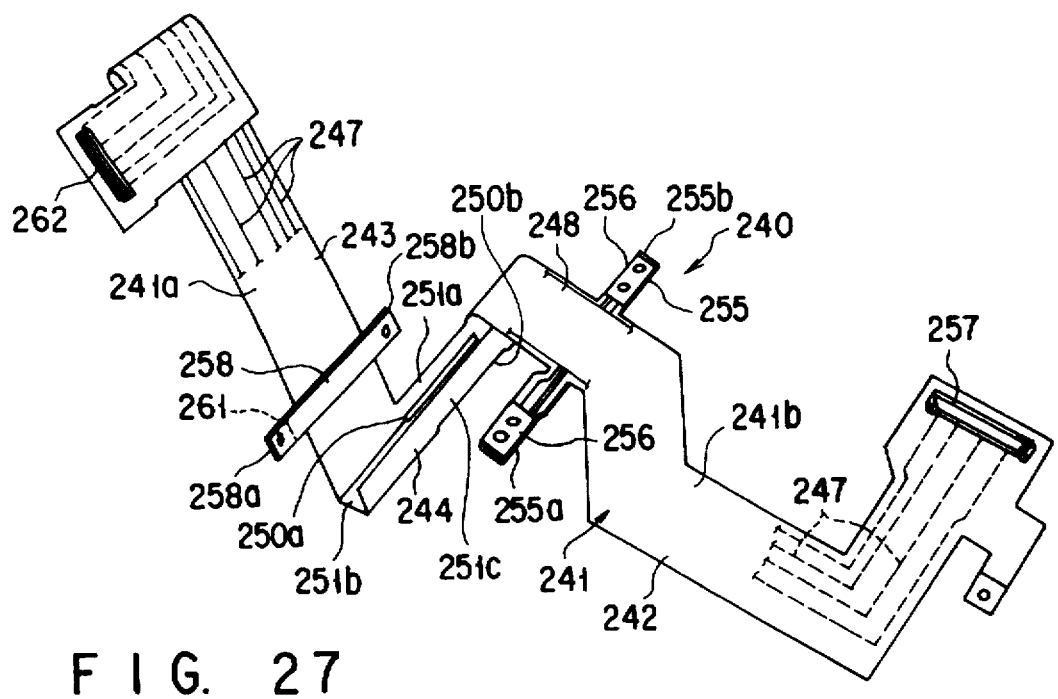
Figure 28:
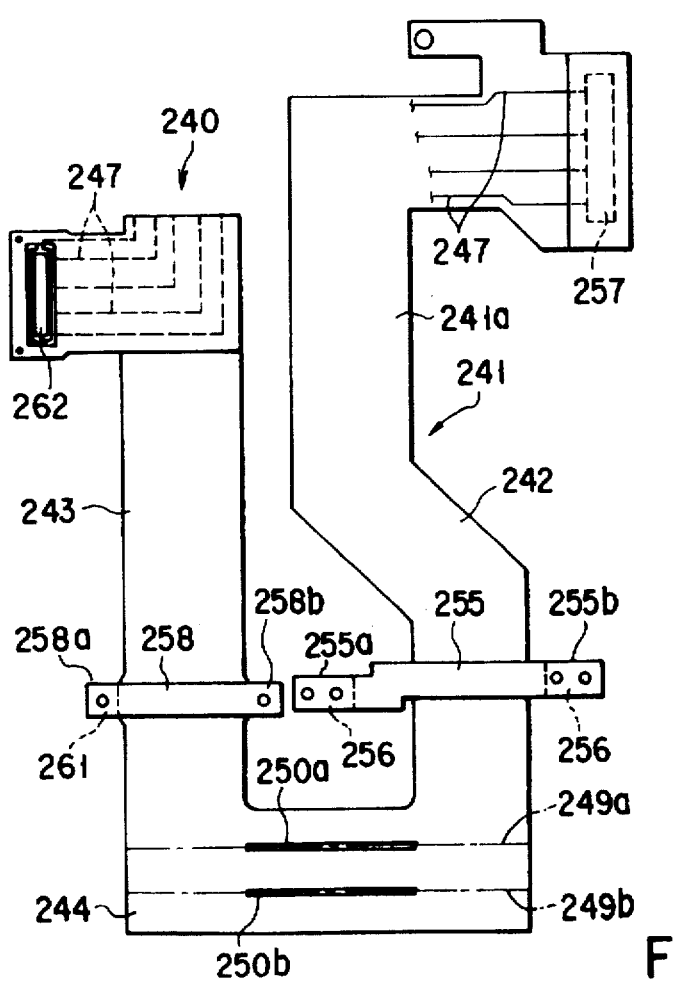

As shown in FIG. 24, the color liquid crystal display 217 is electrically connected to the circuit board 30 through a cable 240. The cable 240 is drawn between the interior of the convex portion 10 and the cable passage 225 through the insertion hole 210b and the communication hole 231. The cable 240 is formed of a flexible wiring board 241 as shown in FIGS. 27 and 28. The flexible wiring board 241 comprises a first board section 242, a second board section 243, and a third board section 244. The first board section 242 is guided to the interior of the housing 3. The second board section 243 is guided to the interior of the display housing 216 of the display unit 215. The third board section 244 is stretched between the first and second board sections 242 and 243. Each of the first to third board sections 242 to 244 is flat plate-shaped to have a width of about 2 cm. The first and second board sections 242 and 243 are formed to be substantially parallel to each other. The third board section 244 extends in a direction, which is perpendicular to the first and second board sections 242 and 243.

The flexible wiring board 241 comprises a first surface 241a having a large number of signal layers 247, and a second surface 241b having a ground layer 248. The ground layer 248 is formed over substantially the entire surface of the second surface 241b.

As shown in FIG. 28, the third board section 244 of the flexible wiring board 241 has two bending lines 249a and 249b. The bending lines 249a and 249b extend in a longitudinal direction of the third board section 244 to be parallel to each other to have a space in the width direction of the third board section 244. The third board section 244 has a pair of slits 250a and 250b. The slits 250a and 250b are positioned on the bending lines 249a and 249b. The slits 250a and 250b are partially formed at the central portion of the third board section 244 without opening to both ends of the third board section 244 in the longitudinal direction. Due to this, rigidity of the third board section 244 becomes low on the bending lines 249a and 249b, so that the third board section 244 can be easily bent along the bending lines 249a and 249b.

Figure 30:
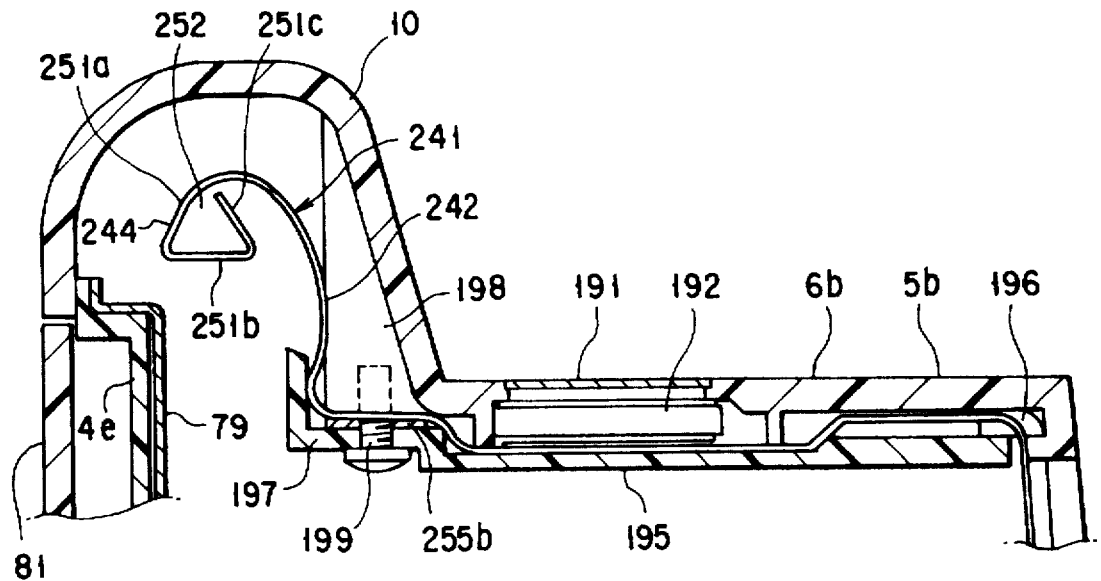

As shown in FIGS. 27 and 30, the third board section 244 is bent to be cross-sectional triangular along the bending lines 249a and 249b. Thereby, the third board section 244 is formed to have a shape of a long and thin triangular pole, which extends in the width direction of the housing 3 as a whole. The third board section 244 has three board surfaces 251a to 251c in a state that the bending lines 249a and 249b serves as boundaries. The board surfaces 251a to 251c are belt-shaped to extend in the width direction of the housing 3. Then, a space 252, which extends in the longitudinal direction of the third board section 244, is formed among these board surfaces 251a to 251c. The third board section 244 is bent to be cross-sectional triangular such that the first surface 241a having the signal layer 247 are positioned at the inner side. Due to this, the signal layer 247 are positioned at the inner side of the ground layer 248 so as to be covered with the ground layer 248.

The third board section 244 is provided to be passed through the insertion hole 210b and the communication hole 231. One end of the third board section 244 is guided to the inner side of the convex portion 10. Then, a first supporting plate 255 is adhered to the end portion of the first board section 242, which is continuous to the third board section 244. The first supporting plate 255 has a pair of engaging portions 255a and 255b. The engaging portions 255a and 255b are projected to both sides of the first board section 242 along the width direction of the first board section 242. As shown in FIGS. 25 and 30, the engaging portions 255a and 255b are formed between the panel holder 195 and the the boss section 198 of the rear section 5b. Then, the engaging portions 255a and 255b and the panel holder 195 are screwed to the rear section 5b with the screw 199. In this case, a conductive layer 256 is formed on a contacting surface between the engaging portions 255a and 255b and the boss section 198. The conductive layer 256 is electrically connected to the ground layer 248. Then, conductive plating is provided to the end surface of the boss section 198, which the conductive layer 256 contacts. Due to this, in a state that the engaging portions 255a and 255b are fixed to the boss section 198, the ground layer 248 is grounded to the housing 3.

As shown in FIGS. 29 and 30, the first board section 242 passes through the portion between the panel holder 195 and the upper wall 6b of the rear section 5b so as to be guided to the lower side of the keyboard 120. The top end of the first board section 242 is guided to the upper surface 30b of the circuit board 30 through the opening portion 23 of the frame 13. A first connector 257 is attached to the top end of the first board section 242. The first connector 257 is connected to the upper surface 30b of the circuit board 30.

As shown in FIGS. 23 and 24, the other end of the third board section 244 is guided to the cable passage 225 of the first coupling section 222a. A second supporting plate 258 is adhered to the end portion of the second board section 243, which is continuous to the third board section 244. The second supporting plate 258 has a pair of engaging portions 258a and 258b. The engaging portions 258a and 258b are projected to both sides of the second board section 243 along the width direction of the second board section 243. As shown in FIG. 23, the engaging portions 258a and 258b are overlaid on a boss section 259 of the inner surface of the rear panel 219, and the engaging portion 258a is screwed to the boss section 259 with a screw 260. In this case, as shown in FIG. 27, a conductive layer 261 is formed on a contact surface between the engaging portion 258a and the boss portion 259. The conductive layer 261 is electrically connected to the ground layer 248. Then, conductive plating is provided to the end surface of the boss section 259, which the conductive layer 261 contacts. Due to this, in a state that the engaging portions 258a is fixed to the boss section 259, the ground layer 248 is grounded to the rear panel 219.

As shown in FIG. 23, the second board section 243 of the cable 240 is formed along the inner surface of the rear panel 219 of the display housing 216. A second connector 262 is attached to the top end of the second board section 243. The second connector 262 is connected to a driving circuit section of the color liquid crystal display 217.

The above-structured flexible wiring board 241 is fixed to each of the housing 3 and the display housing 216 in the vicinity of both end portions of the third board section 244. Due to this, if the display unit 215 is rotated between the closing position and the opening position, the third board section 244, which is bent like a triangle pole, is axially twisted to allow the display unit 215 to rotate.

Figure 32:
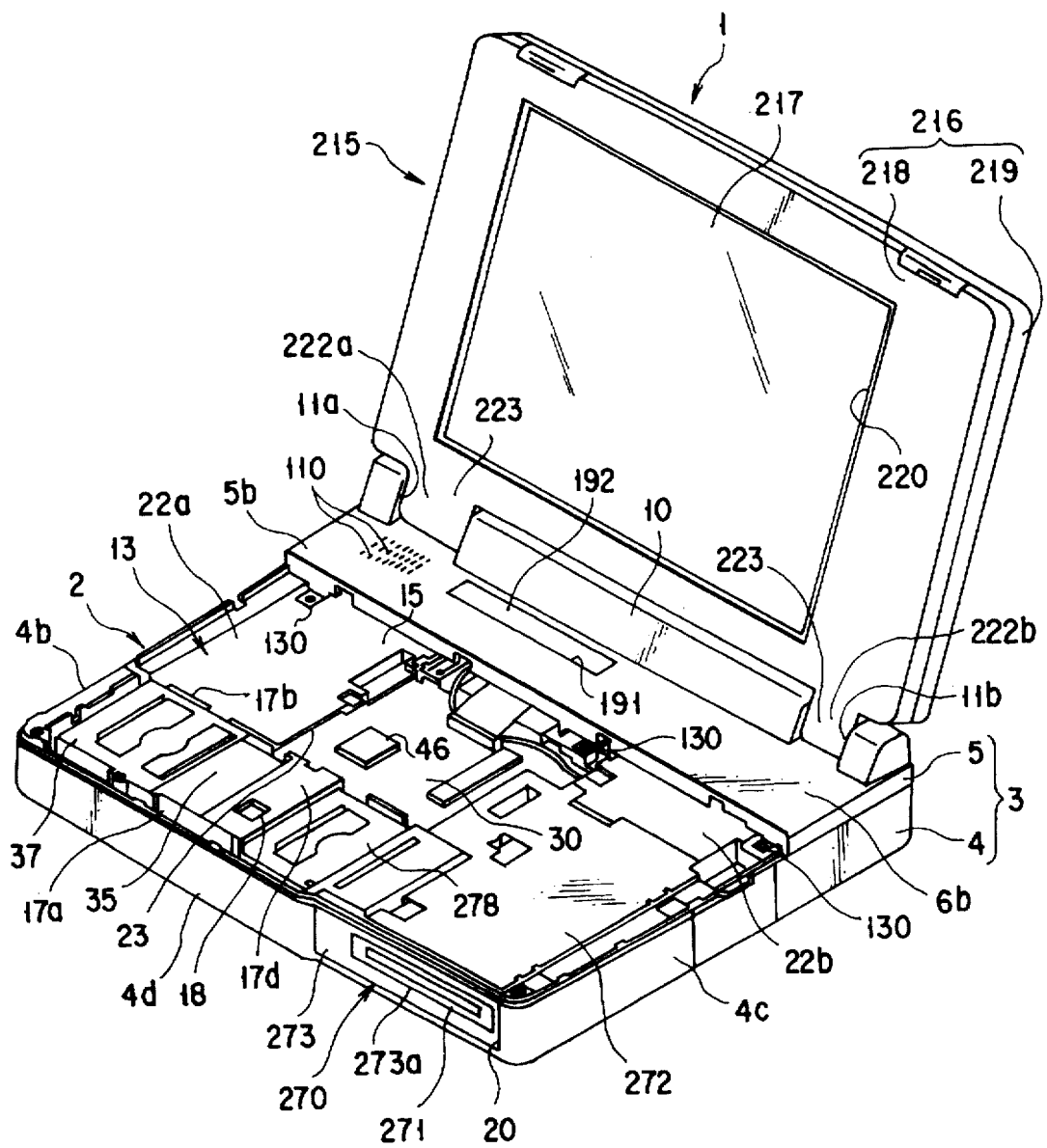
Figure 33:
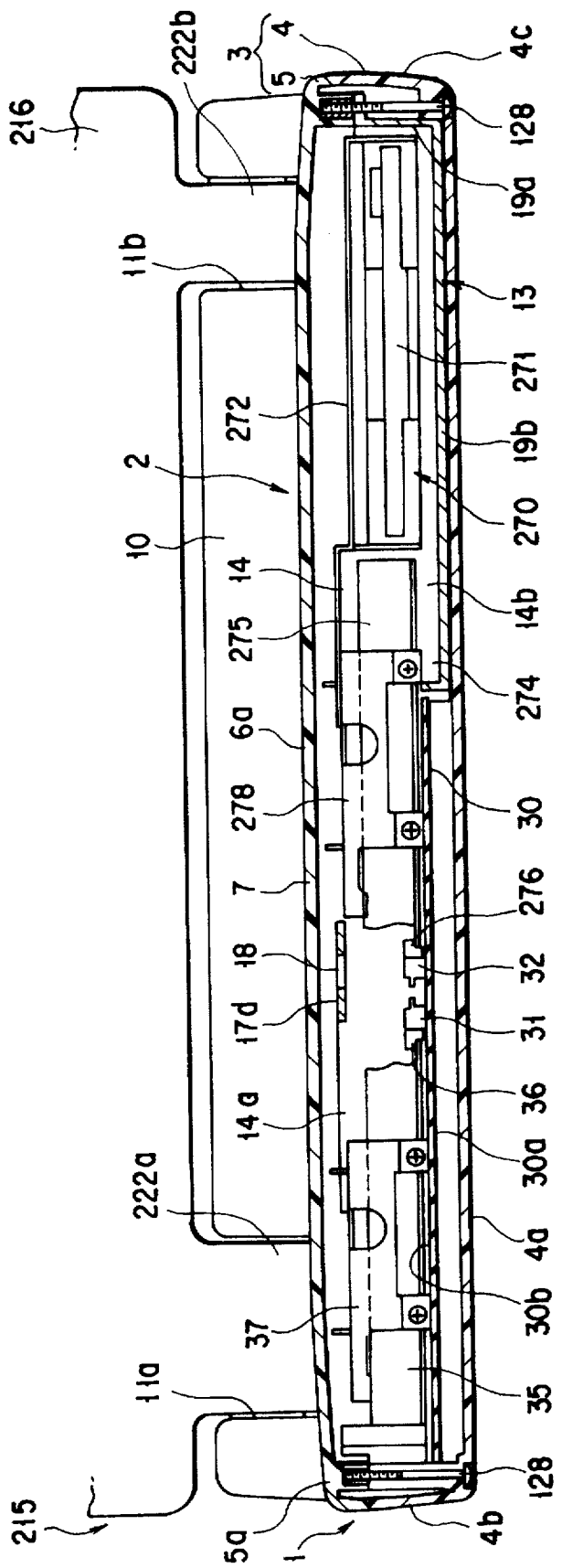

As shown in FIGS. 32 and 33, in the computer 1 of the above-explained first embodiment, a floppy disk driving device 270 (FDD) is selected to be mounted in place of the CD-ROM driving device 40. For replacing the CD-ROM driving device 40 for the FDD 270, the screw 128 is loosened to detach the front section 5a from the lower housing 4, thereby exposing the unit containing section 14 of the frame 13, as shown in FIGS. 3 and 32.

Figure 34:
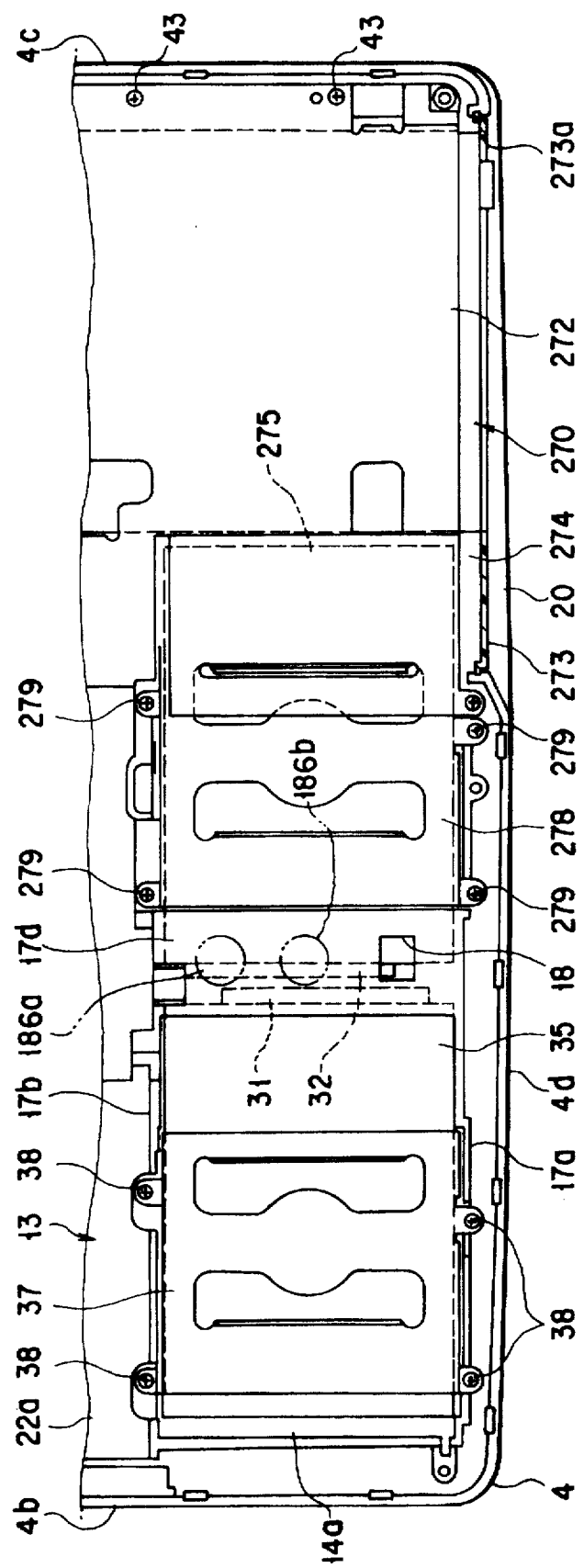

The FDD 270 has a size, which is more compact than the CD-ROM driving device 40. A loading port 271 for accessing/discharging a floppy disk is provided on the front surface of the FDD 270. The FDD 270 is supported by the second containing section 14b of the frame 13 through a FDD bracket 272 made of metal sheet. The FDD bracket 272 is flat plate-shaped to cover the second containing section 14b from the upper side, and the lower surface of the FDD bracket 272 is supported by the FDD 270. The FDD bracket 272 is detachably fixed to the second containing section 14b with the screw 43. In this case, as shown in FIG. 34, the FDD 270 is positioned to be biased to the right side of the housing 3, and the loading port 271 faces to the opening portion 20 of the front wall 4d of the lower housing 4.

As mentioned above, the FDD 270 has the size, which is more compact than the CD-ROM driving device 40. Due to this, as shown in FIG. 34, a front cover 273 is detachably attached to the front wall 4d of the lower housing 4 so as to close the gap between the opening edge portion of the opening portion 20 and the front surface of the FDD 270. The front cover 273 has a communication hole 273a, which is continuous to the loading port 271.

As shown in FIG. 33, in a state that the FDD 270 is provided in the second containing section 14b, a space 274 is formed at the left side of the FDD 270. The space 274 is continuous to the right half of the first containing section 14a. Due to this, in the case where the FDD 270 is provided in the second containing section 14b, an optional HDD 275 can be provided thereto by use of the space 274. The HDD 275 is mounted on the upper surface 30b of the circuit board 30 to be placed at a position between the FDD 270 and the HDD 35, in the lower side of the arm rest 7. The HDD 275 has a connector 276. The connector 276 is positioned at the lower side of the switch supporting wall 17d, and connected to the second hard disk connector 32. A bracket 278, made of metal sheet, is screwed to the HDD 275. The bracket 278 is used to detachably fix the HDD 275 to the space 274 and the first containing section 14a. The bracket 278 is fixed to the front and back walls 17a and 17b of the first containing section 14a with screws 279.

The HDD 275 is provided to the first containing section 14a before the FDD 270 is provided to the second containing section 14b. In other words, for providing the HDD 275 to the first containing section 14a, the bracket 278 is screwed to the HDD 275. Then, the HDD 275 is put between the front wall 17a and the back wall 17b from the right side of the switch supporting wall 17d, to be mounted on the upper surface 30b of the circuit board 30. Under this state, the operator puts the tip of his finger on the bracket 278 to slide the HDD 275 to the left side of the first containing section 14a, so that the connector 276 of the HDD 275 is connected to the second hard disk connector 32. Finally, the bracket 278 is fixed to the first containing section 14a with the screws 279, so that the HDD 275 can be maintained in the first containing section 14a.

Thereafter, the FDD 270 is mounted on the second containing section 14b, and the FDD bracket 272 is fixed to the second containing section 14b with the screws 43. Thereby, as shown in FIGS. 33 and 34, the left end portion of the FDD bracket 272 is overlaid on the upper surface of the bracket 278, and the provision of the FDD 270 and the HDD 275 to the housing 3 is finished.

In the above-structured first embodiment, the IC chip 49 of the TCP 47 is heated at the operation time of the computer 1. Since the second chip surface 49b of the IC chip 49 is adhered to the lower surface 30a of the circuit board 30 with heat conductive adhesion 53, heat of the IC chip 49 is directly transmitted to the circuit board 30.

The frame 13 for supporting the circuit board 30 has the heat receiving part 145, which is provided at the position corresponding to the TCP 47 to come in contact with the upper surface 30b of the circuit board 30. Due to this, heat of the IC chip 49 transmitted to the circuit board 30 is transmitted to the board supporting section 16 of the frame 13 through the heat receiving part 145. In this case, since the circuit board 30 has the large number of through holes 140 connecting the IC chip 49 to the heat receiving surface 146, the space of the interior of these through holes 140 serves as a passage for directly transmitting heat of the IC chip 49 to the heat receiving surface 146. Moreover, in the circuit board 30, the heat conductive layers 142a and 142b are formed on the lower surface 30b to which the IC chip 49 is adhered and the upper surface 30a, which the elastic sheet 147 contacts, respectively. Then, the heat conductive layers 142a and 142b are continuous to the plating layer 141 coating the inner surface of the through holes 140. Due to this, heat of the IC chip 49 is positively transmitted to the heat receiving surface 146 through the heat conductive layers 142a and 142b and the plating layer 141. Therefore, the measures to improve heat conductivity is provided to the circuit board 30 itself, and heat of the IC chip 49 can be efficiently transmitted to the heat receiving surface 146.

Moreover, in the first embodiment, the spring member 161 contacts the lower surface of the package cover 55 for covering the TCP 47 and the circuit board 30 is pushed up the heat receiving part 145 through the spring member 161. Also, since the elastic sheet 147 having thermal conductivity is formed between the upper surface 30b of the circuit board 30 and the heat receiving surface 146 of the heat receiving part 145, the gap, which prevents thermal conductivity, is not generated between the circuit board 30 and the heat receiving port 145. Therefore, heat of the IC chip 49 can be efficiently transmitted to the heat receiving part 145 from the circuit board 30 through the elastic sheet 147. Since the frame 13 including the heat receiving part 145 is formed of a magnesium alloy, to which heat is easily transmitted, heat of the IC chip 49 transmitted to the heat receiving part 145 is widely diffused to the board supporting section 16. Thereby, heat does not locally stay the frame 13.

For using the computer 1, if the power switch 173 is turned on, the motor fan 167 is driven. Since the motor fan 167 absorbs air through the inhalation ports 170 of the fan casing 168, the interior of the housing 3 becomes negative pressure. Due to this, external air of the computer 1 is absorbed into the housing 3 through the cooling air intake port 181 and the gap 70 of the bottom of the housing 3. In this case, the cooling air passage 151 is formed at the heat receiving part 145, and the cooling air outlet 154 of the passage 151 faces to the inhalation port 170. Due to this, much air absorbed to the housing 3 is guided to the cooling air inlet 153 of the passage 151.

Since the passage 151 is cylindrically formed be hollow, air guided to the passage 151 is circulated, as cooling air, in the passage 151 without being leaked or diffused to the housing 3. Then, cooling air is absorbed to the fan casing 168 through the inhalation port 170 from the cooling air outlet 152 of the passage 151, and discharged to the back portion of the housing 3 through the exhaust ports 174 of the lower housing 4 from the fan casing 168.

The cooling air intake port 181 is positioned to be biased to the side, which is closer to the cooling air inlet 153 of the passage 151 than the inhalation port 170 of the motor fan 167. The gap 70 is also formed at the side of the cooling air inlet 153 of the passage 151. Due to this, air absorbed from the cooling air intake port 181 and the gap 70 is neither detoured through the interior of the housing 3 nor diffused thereto. In other words, air is directly guided to the cooling air inlet 153 of the passage 151. Due to this, cooling air is efficiently guided to the passage 151, and an amount of cooling air circulating the passage 151 is increased.

As a result, the heat of the IC chip 49 transmitted to the heat receiving part 145 is forcibly canceled by cooling air flowing to the passage 151. Due to this, the temperature rise of the heat receiving part 145 can be prevented, and heat radiation efficiency of the IC chip 49 can be improved.

Moreover, since the plurality of radiation fins 155, which are continuous to the heat receiving surface 146, are presence in the passage 151, the heat radiation area of the heat receiving surface 146 and the contact area between the cooling air and the heat receiving surface 146 are increased, so that heat radiation effect of the heat receiving part 145 can be further improved. Furthermore, since the heat radiation fins 155 extend along the direction of the passage 151, the flow of cooling air cannot be prevented by the radiation fins 155. Due to this, resistance of cooling air of the passage 151 can be controlled to be small, and the amount of air and a flow velocity can be sufficiently ensured. Therefore, even in the TCP 47 having difficulty in cooling by use of the general heat radiation fins, both heat transmission to the frame 13 and forcible cooling by the motor fan 167 are used, thereby the heat radiation of the TCP 47 can be efficiently performed.

Moreover, since the inhalation port 170 of the fan casing 168 has the second opening portion 170b opened to the interior of the housing 3, a part of air absorbed from the cooling air inlet port 181 and the gap 70 is guided to the second opening portion 170b through the surroundings of the board supporting section 16 and the package cover 55. Due to this, the board supporting section 16 and the package cover 55 covering the TCP 47 are also positioned at the passage of the flow of cooling air. Then, both the heat receiving part 145 of the frame 13 and the package cover 55 receiving radiation heat of TCP 47 can be forcibly cooled. Due to this, air permeability around the board supporting section 16 including the heat receiving part 145 can be maintained well, so that heat radiation of TCP 47 can be improved.

Furthermore, according to the above-structured computer 1, the cooling air inlet port 181 is formed of the number of notches 182, which are arranged to have a space in the width direction of the keyboard attaching port 8, to be shaped like coarse-teeth as a whole. Due to this, the opening area of the cooling air inlet port 181 can be sufficiently ensured, and much air can be efficiently absorbed from the wide range of the keyboard attaching port 8.

Since the cooling air inlet port 181 is formed on the peripheral wall 9 continuous to the back edge of the opening of the keyboard attaching port 8, the cooling air inlet port 181 is covered with the keys 122 of the inside of the keyboard attaching port 8, so that the presence of the cooling air inlet port 181 is not emphasized. Also, since the gap 70 formed between the card insertion port 64 and the card cover 67 is positioned at the bottom portion of the housing 3, the gap 70 is concealed from the outside of the housing 3. Due to this, air can be absorbed to the interior of the housing 3 without forming the hole on the peripheral surface of the housing 3, so that the appearance of the computer 1 can be maintained well.

In addition, since the frame 13 is a die-cast molding, which is formed of a magnesium alloy, the complicated structure such as the heat receiving part 145 having the radiation fins 155 can be easily formed in the board supporting section 16. The passage 151 of the heat receiving part 145 is structured by closing the opening portion 149a of the concave portion 149 of the frame 13 by the cover 150. Due to this, though the passage 151 is cylindrically formed to be hollow, there can be simplified the structure of the die, which is used in die-cast molding the frame 13.

The magnesium alloy, which forms the frame 13, heat conductivity is lower than high heat conductive material such as an aluminum alloy. However, since the heat radiation performance is improved by forcibly cooling the heat receiving part 145, the frame 13 can be formed of the magnesium alloy, which is lighter than the aluminum alloy. Due to this, the weight of the computer 1 can be reduced and the frame 13 can be effectively used as the heat sink of the TCP 47.

In the above-mentioned computer 1, the flexible wiring board 241 is used as the cable 240 for electrically connecting the circuit board 30 of the housing 3 to the display unit 215. The reason of using the flexible wiring board 241 is as follows.

More specifically, in the conventional computer, the circuit board and the display unit are electrically connected to each other through a soft cable. The conventional cable is formed of bundling the large number of lead lines. The cable is wired through a coupling portion between a display supporting section of a housing and a coupling section of the display unit. The display supporting section has a first side surface having a cable insertion hole formed, and is continuous to the interior of the housing. The coupling section of the display unit has a second side surface having a communication hole formed. The second side surface is formed to face to the first side surface. The communication hole faces to the cable insertion hole and is continuous to the interior of the display unit. Due to this, the housing and the display unit are communicated with each other through the cable insertion hole and the communication hole, and the cable is wired through the cable insertion hole and the communication hole. Therefore, if the display unit is rotated to the closing position or the opening position, the cable is freely deformed at the portion where the cable are inserted through the cable insertion hole and the communication hole so as not to prevent the rotation of the display unit.

However, the recent portable computers have been advanced in the points of the high speed performance and the high functional operation. In accordance with such the advancement, there is a tendency for the number of signals to be dealt with to be increased. Due to this, in the conventional cable, which is formed by bundling the large number of leads, the number of lead lines is increased in accordance with the increase in the number of the signals, and the cable is thickened. As a result, the cable can not be passed through the cable insertion hole and the communication hole, and there causes difficulty in bending the cable due to the increase in the thickness. Then, it is difficult to draw the cable in the housing and the display unit. There also causes a problem in that the connector, which is continuous to the lead lines, is enlarged.

In order to deal with these problems, there is known the computer using a flat flexible wiring board as a cable. As compared with the cable formed by bundling the number of lead lines, the above flat flexible wiring board has an advantage in which the large number of signal layers can be formed by a minute pitch and no trouble occurs if the number of signals is increased.

The above flexible wiring board comprises a first board section guided to the interior of the housing, a second board section guided to the interior of the display unit, and a third board section for connecting the first and second board sections as one unit. The first board section is electrically connected to the circuit board through the connector. The second board section is connected to the driving circuit of the display unit through the connector. The third board section has a winding portion, which is spirally wound, and the winding portion is inserted to the cable insertion hole and the communication hole. Due to this, when the display unit is rotated, the winding portion of the third board section is twisted in a direction where the winding section of the third board section is tightly or loosely wound, thereby the rotation of the display unit is allowed.

According to the above-mentioned structure, the third board section is spirally wound. Due to this, when the display unit is rotated, both end portions of the third board section, which are continuous to the first and second board sections, are repeatedly deformed in the tightly or loosely winding direction. As a result, the following problem may occur.

More specially, stress concentrates on both end portions of the third board section, so that the signal layers are easily broken. Further, since the third board section is simply and spirally wound, it is difficult to maintain the shape. Due to this, there is a possibility that the third board section will interfere with the inner surface of the display supporting section or the inner surface of the coupling section when the display unit is rotated, so that the signal layers are easily broken.

In addition, since the flexible wiring board has both flexibility and a certain degree of rigidity, it takes much time to spirally wind the third board section and pass the third board section through the cable insertion hole and the communication hole. Due to this, the workability of assembling the computer worsens.

In order to improve the work of spirally winding the third board section, it can be considered that the third board section is band-shaped to have a narrow width in advance. However, the number of the signal layers on the third board section is largely limited, so that there occurs a problem in which the merits of using the flexible wiring board is lost.

In contrast, according to the above-structured flexible wiring board 241, the third board section 244 to which the insertion hole 210b and the communication hole 231 are axially inserted is bent like a thin and long triangle pole. The end portions of the first and second board sections 242 and 243, which are continuous to the third board section 244, are screwed to the rear housing section 5b of the housing 3 and the rear panel 219 of the display housing 216, respectively. Due to this, when the display unit 215 is rotated to the closing position or the opening position, the third board section 244 is axially twisted over the whole length of the third board section 244. Thereby, local bending or stress can be prevented from being generated on a specific portion of the third board section 244. Therefore, the damage of the third board section 244 and the breakage of the signal layer 247 and the ground layer 248 can be prevented, so that reliability of electrical connection can be improved.

Moreover, in the state that the third board section 244 is bent, the space 252 is formed among three board surfaces 251a to 251c over the whole length of the third board section 244. Therefore, as compared with the case in which three board surfaces 251a to 251c are overlaid on each other, rigidity of the third board section 244 can be controlled to be low. Due to this, when the display unit 215 is rotated, the third board section 244 is twisted over the whole length of the third board section without having any problem, so that stress can be surely prevented from being generated on the specific portion of the third board section 244.

In addition, since the third board section 244 is bent to be cross-sectional triangular along the bending lines 249a and 249b, the bent shape can be surely maintained as compared with the case in which the board is spirally wound. Therefore, the third board section 244 is neither broken at the portion where the third board section 244 is passed through the insertion hole 210b and the communication hole 231 nor expanded. Then, the third board section 244 can be prevented from interfering with the first coupling section 222a of the display housing 216 or the convex portion 10 of the housing 3.

Moreover, as shown in FIG. 28, the third board section 244 is flat shaped to have a width, which is substantially the same as the first and second board sections 242 and 243 before the third board section 244 is bent. Therefore, the limitation of the number of the signal layers 247 are largely relaxed, thereby making it possible to deal with the increase in the number of signals based on the high functional operation and the high speed performance of the computer 1 without having any problem.

In addition, the third board section 244 is bent in a state that the signal layers 247 are positioned at the inner side, and these signal layers 247 are externally covered with the ground layer 248. Moreover, the ground layer 248 is grounded to the rear section 5b and the rear panel 219 through the conductive layers 256 and 261 of the first and second supporting boards 242 and 243 when the flexible wiring board 241 is fixed to the rear section 5b and the rear panel 219. Due to this, the signal layers 247 to which the high-speed signals flow can be shielded by use of the ground layer 248. Therefore, the provision of the special shielding member can be omitted, or the shield structure can be simplified, so that the manufacturing cost of the computer 1 can be reduced.

The present invention is not limited to the above first embodiment. The following will explain a second embodiment of the present invention with reference to FIGS. 35A and 35B.

The second embodiment is different from the first embodiment in the point of the direction of cooling air blowing to the passage 151, and the other structure is the same as the first embodiment.

In the second embodiment, the motor fan 167 is structured such that the blowing direction is opposite to the case of the first embodiment. More specifically, the motor fan 167 is supported by the frame 13 in a state that the absorption port 167c of the fan frame 167b is directed to the side wall 4c of the lower housing 4. Then, an inlet (not shown) is formed in the side wall 4c. Since the blowing direction is opposite to the case of the first embodiment, the cooling air inlet 153 of the passage 151 is opened to the notch 22 of the frame 13. Also, the cooling air inlet 153 is formed to face to the discharge port 167d of the fan frame 167b. Due to this, if the motor fan 167 is driven, external air of the housing 3 is directly sent to the cooling air inlet 153 of the passage 151.

In the above-structured second embodiment, the heat receiving part 145 for receiving heat of the TCP 47 can be forcibly cooled by cooling air flowing to the passage 151. Therefore, the temperature rise of the heat receiving part 145 can be controlled, and heat radiation efficiency of TCP 47 can be improved.

The following will explain a third embodiment of the present invention with reference to FIG. 36.

The third embodiment is different from the first embodiment in the point of the heat transmission passage to the heat receiving part 145 of the frame 13. The other structure is the same as the first embodiment.

As shown in FIG. 36, the TCP 47 is mounted on the upper surface 30a of the circuit board 30 in the so-called face down state in which the first chip surface 49a of the IC chip 49 is directed to the circuit board 30. There is provided an elastic sheet 340 between the first chip surface 49a of the IC chip 49 and the upper surface 30b of the circuit board 30. The elastic sheet 340 is formed of rubber material, which is obtained by adding alumina to silicone resin, and has thermal conductivity. The elastic sheet 340 is provided so as to transmit heat of the IC chip 49 to the circuit board 30. Also, the elastic sheet 340 is positioned to face to the other end of the through hole 140 of the circuit board 30. A radiation plate 341, made of metal, is overlaid on the lower surface 30a of the circuit board 30. The radiation plate 341 is positioned to face to one end of the through hole 140.

The package cover 55 for covering the TCP 47 is attached to the upper surface 30b of the circuit board 30. The panel 56 of the package cover 55 is provided between the IC chip 49 and the heat receiving part 145 of the frame 13. The second chip surface 49b of the IC chip 49 is adhered to the central portion of the lower surface of the panel 56 with adhesive 342 having heat conductivity. Also, the upper surface of the panel 56 of the package cover 55 contacts the heat receiving surface 146 of the heat receiving part 145.

In the above-structured third embodiment, if the IC chip 49 is heated, the heat of the IC chip 49 is transmitted to the circuit board 30 through the elastic sheet 340. The circuit board 30 has a large number of through holes 140 for connecting the elastic sheet 340 to the radiation plate 341. Due to this, the space of the interior of these through holes 140 serves as a passage for directly transmitting the heat of the IC chip 49 to the radiation plate 341. Therefore, the heat of the IC chip 49 can be efficiently transmitted to the radiation plate 341, and the heat does not locally stay on the circuit board 30.

Furthermore, since the IC chip 49 is adhered to the panel 56 of the package cover 55 with adhesive 342, and the panel 56 contacts the heat receiving part 145 of the frame 13, the heat of the IC chip 49 is also transmitted to the heat receiving part 145. Since the heat receiving part 145 has the passage 151 similar to the first embodiment, the heat of the IC chip 49 transmitted to the heat receiving part 145 is forcibly canceled by cooling air flowing to the passage 151. Due to this, the temperature rise of the heat receiving part 145 can be prevented, and heat radiation efficiency of the IC chip 49 can be improved.

Therefore, according to the third embodiment, the heat radiation of the TCP 47 can be efficiently performed by multiplier effect of the heat transmission to the radiation plate 341 and the frame 13 and forcibly cooling due to the motor fan 167.

The following will explain a fourth embodiment of the present invention with reference to FIG. 37.

The fourth embodiment is different from the third embodiment in the point of the structure for transmitting the heat of the IC chip 49 to the heat receiving part 145 of the frame 13. The other structure is the same as the third embodiment.

More specifically, in the fourth embodiment, the TCP 47 is exposed to the upper surface 30b of the circuit board 30, and the second chip surface 49b of the IC chip 49 is formed to face to the heat receiving surface 146 of the heat receiving part 145. There is provided an elastic sheet 350 between the first chip surface 49b of the IC chip 49 and the heat receiving surface 146. The elastic sheet 350 is formed of rubber material, which is obtained by adding alumina to silicone resin, and has thermal conductivity. The elastic sheet 350 is provided so as to transmit heat of the IC chip 49 to the heat receiving part 145. The elastic sheet 350 contacts the second chip surface 49b of the IC chip 49 and the heat receiving surface 146 of the heat receiving part 145 without having any space.

According to the above-mentioned structure, the heat of the IC chip 49 is directly transmitted to the heat receiving part 145 through the elastic sheet 350. Due to this, the heat of the IC chip 49 can be efficiently transmitted to the heat receiving part 145, and the heat radiation efficiency of the IC chip 49 can be improved.

The following will explain a fifth embodiment of the present invention with reference to FIG. 38.

In the fifth embodiment, a reinforcing board 301 is adhered to one board surface 251b of the third board section 244 of the cable 241. The reinforcing board 301 is formed of an elastically deformable metallic plate, such as thin stainless plate, and has rigidity enough to prevent the twist of the third board section 244. The reinforcing board 301 extends over substantially the whole length of the board surface 251b at the outside of the board surface 251b.

According to the above-mentioned structure, the bent shape of the third board section 244 can be maintained by the presence of the reinforcing board 301, and the workability of passing the third board section 244 through the insertion hole 210b and the communication hole 231 can be improved. Moreover, the reinforcing board 301 is adhered between the bending liens 249a and 249b in advance before the third board section 244 is bent. Thereby, the reinforcing board 301 can be used as a guide, which is used in bending the third board section 244. Therefore, the bending work of the third board section 244 can be easily performed.

Furthermore, since the reinforcing board 301 is positioned at the outside of the board surface 251b, the reinforcing board 301 can be used as a shield board of the cable 240. Thereby, high frequency noise can be prevented from being leaked from the third board section 244.

The following will explain a sixth embodiment of the present invention with reference to FIG. 39.

In the sixth embodiment, the third board section 244 is bent along the bending lines 249a and 249b such that three board surfaces 251a to 251c are placed to be parallel to each other. Then, a gap 310 is formed between the adjacent board surfaces 251b and 251c over the whole length of the third board section 244. Due to this, the third board section 244 is bent like substantially a flat rod.

In the above-mentioned structure, the third board section 244 is axially twisted over the whole length of the third board section 244 when the display unit 215 is rotated. Thereby, stress can be prevented from being generated on the specific portion of the third board section 244.

In the sixth embodiment, if the gap 310 is filled with adhesive, the space between the adjacent board surfaces 251b and 251c can be normally and constantly maintained. Due to this, even if the third board section 244 is twisted in the axial direction, stress can be surely prevented from being generated on the specific portion of the third board section 244.

The present invention is not limited to the above-explained embodiments. Various modifications can be worked within the scope of the present invention.

For example, the material of the frame is not limited to the magnesium alloy. The frame may be formed of an aluminum alloy having high heat conductivity by ignoring the reduction of the weight of the frame to a certain extent. In this case, diffusion of the heat transmitted to the heat receiving part is efficiently performed, and the heat radiation efficiency of TCP can be improved.

Moreover, the portable electronic apparatus of the present invention is not limited to the notebook-type portable computers. The present invention can be also applied to the other portable electronic apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable electronic apparatus comprising:

a box-shaped housing having a wall with exhaust ports formed therein;

a metal-made frame contained in said housing;

a circuit board supported by said frame, and contained in said housing;

a circuit element, mounted on said circuit board, and generating heat while operating; and a fan, contained in said housing, for absorbing external cooling air into said housing, wherein said frame has a heat receiving part at a position corresponding to said circuit element, wherein heat of said circuit element is transmitted to said heat receiving part, said heat receiving part having a cooling air passage to which air absorbed in said housing is guided, and cooling air passed through said cooling air passage is forcibly discharged to an outside of said housing from said exhaust ports through said fan.

2. The apparatus according to claim 1, wherein said cooling air passage has therein a plurality of heat radiation fins, and these heat radiation fins extend along a direction where said cooling air flows.

3. The apparatus according to claim 2, wherein said cooling air passage has a cooling air inlet where said cooling air enters and a cooling air outlet where said cooling air is discharged, said fan has a fan casing having an absorption port for absorbing said cooling air, and said absorption port faces to said cooling air outlet of said cooling air passage.

4. The apparatus according to claim 3, wherein said absorption port of said fan casing communicates with said cooling air of said cooling air passage and interior of said housing.

5. The apparatus according to claim 3, wherein said fan casing comprises a power source containing section, and said power source containing section contains a power source unit generating heat while operating.

6. A portable electronic apparatus comprising:

box-shaped housing having a wall with exhaust ports formed therein;

metal-made frame contained in said housing;

a circuit board supported by said frame, and contained in said housing, said circuit board having a first surface and a second surface positioned at an opposite side of said first surface;

a circuit element, mounted on said first surface of said circuit board, and generating heat while operating; and a fan, contained in said housing, for absorbing external cooling air into said housing, wherein said frame has a heat receiving part brought into contact with said second surface of said circuit board at a position corresponding to said circuit element, said heat receiving part has a cooling air passage to which air absorbed in said housing is guided, and cooling air passed through said cooling air passage is forcibly discharged to an outside of said housing from said exhaust ports through said fan.

7. The apparatus according to claim 6, wherein said cooling air passage has therein a plurality of heat radiation fins, and these heat radiation fins extend along a direction where said cooling air flows.

8. The apparatus according to claim 6, wherein said circuit board has a large number of through holes adjacent to said circuit element, and each of these through holes has one end formed on said first surface of said circuit board to face to said circuit element, and the other end formed on said second surface of said circuit board to face to said heat receiving part.

9. The apparatus according to claim 8, wherein said second surface of said circuit board and said heat receiving part contact each other through a heat transmission layer, and inner surfaces of said through holes are covered with a plating layer having heat conductivity, and said plating layer is continuous to said heat transmission layer.

10. The apparatus according to claim 9, wherein said circuit element is adhered to said first surface of said circuit board with adhesive having heat conductivity.

11. The apparatus according to claim 6, wherein said heat receiving part has a heat receiving surface facing to said second surface of said circuit board, an elastic sheet having heat conductivity is provided between said heat receiving surface and said second surface, and said frame has a spring member pressing said circuit board to said heat receiving surface.

12. A portable electronic apparatus comprising:

a box-shaped housing having a wall with exhaust ports formed therein;

a metal-made frame cast-molded, and said frame contained in said housing;

a circuit board supported by said frame, and contained in said housing;

a circuit element, mounted on said circuit board, and generating heat while operating; and a fan, contained in said housing, for absorbing external cooling air into said housing, wherein said frame has a heat receiving part at a position corresponding to said circuit element, wherein heat of said circuit element is transmitted to said heat receiving part, wherein said heat receiving part has a concave portion including an opening portion formed at a side opposite to said circuit board, and a cover member for closing said opening portion of said concave portion, and wherein said cover member forms a cylindrical hollow cooling air passage to which cooling air absorbed in said housing is guided in cooperation with said concave portion, and cooling air passed through said cooling air passage is forcibly discharged to an outside of said housing from said exhaust ports through said fan.

13. The apparatus according to claim 12, wherein the concave portion of said heat receiving part has a bottom surface facing to said opening portion, a plurality of heat radiation fins is formed on said bottom surface, and these heat radiation fins extend along a direction where said cooling air flows.

14. A portable electronic apparatus comprising:

a box-shaped housing having an upper surface having a keyboard attaching port and a wall having exhaust ports formed therein;

a metal-made frame contained in said housing to face to said keyboard attaching port;

a keyboard, mounted on said frame, having a number of keys positioned at said keyboard attaching port;

a circuit board supported by said frame, and contained in said housing;

a circuit element, mounted on said circuit board, and generating heat while operating; and a fan, contained in said housing, for absorbing external cooling air into said housing, wherein said frame has a heat receiving part at a position corresponding to said circuit element, and wherein heat of said circuit element is transmitted to said heat receiving part, wherein said heat receiving part includes a cooling air passage having a cooling air inlet to which cooling air absorbed in said housing is guided, and a cooling air outlet continuous to said fan, and cooling air passed through said cooling air passage is forcibly discharged to an outside of said housing from said exhaust ports through said fan, said upper surface of said housing has a wall extending downward from an opening peripheral edge portion of said keyboard attaching port to the interior of said housing, said wall has a cooling air intake port continuous to the interior of said housing, and said cooling air intake port is adjacent to keys of said keyboard.

15. The portable electronic apparatus according to claim 14, wherein said cooling air intake port is positioned in the vicinity of said cooling air inlet of said cooling air passage.

16. The portable electronic apparatus according to claim 14, wherein said cooling air intake port has a large number of notches formed on said wall, and these notches are spaced apart in a width direction of said housing.

17. The portable electronic apparatus according to claim 14, wherein said cooling air passage has therein a plurality of heat radiation fins extending along a direction where said cooling air flows.

18. The portable electronic apparatus according to claim 14, wherein said housing has a bottom surface and a side surface continuous to said bottom surface, a card insertion port having a bottom opening formed on said bottom surface and a side opening formed on said side surface, and a cover supported by said housing is rotatable between a closing position where said card insertion port is closed and an opening position where said card insertion port is opened, and a gap is formed between said bottom opening of said card insertion port and said cover to be continuous to said interior of said housing even in a state that said cover is rotated to said closing position.

19. A portable electronic apparatus comprising:

a box-shaped housing having a wall with exhaust ports formed therein;

a metal-made frame contained in said housing;

a circuit board supported by said frame and contained in said housing, said circuit board having a first surface and a second surface opposing said first surface;

a circuit element, mounted on said first surface of said circuit board, and generating heat while operating; and a fan, contained in said housing, for absorbing external cooling air into said housing, wherein said frame includes a heat receiving part with a heat receiving surface facing the second surface of said circuit board at a position corresponding to said circuit element, an elastic sheet having heat conductivity positioned between said heat receiving surface and said second surface, and a spring member for pressing said circuit board to said heat receiving surface, and wherein the heat receiving part of said frame has a cooling air passage to which cooling air absorbed in said housing is guided, and cooling air passed through said cooling air passage is forcibly discharged to an outside of said housing from said exhaust ports through said fan.

* * * * *